United States Patent [19]

Washio et al.

[11] Patent Number: 5,237,400
[45] Date of Patent: Aug. 17, 1993

[54] COMPACT COLOR IMAGE PROCESSING APPARATUS WITH ENHANCED DENSITY CONVERSION

[75] Inventors: Koji Washio; Tetsuya Niitsuma; Kazuyoshi Tanaka; Takashi Hasebe, all of Hachioji; Seiichiro Hiratsuka, Fukuoka, all of Japan

[73] Assignee: Konica Corporation, Tokyo, Japan

[21] Appl. No.: 649,056

[22] Filed: Feb. 1, 1991

[30] Foreign Application Priority Data

Feb. 5, 1990 [JP] Japan ................................. 2-25781
Feb. 5, 1990 [JP] Japan ................................. 2-25782

[51] Int. Cl.$^5$ ............................................. H04N 1/46
[52] U.S. Cl. ..................................... 358/518; 358/516
[58] Field of Search ........................... 358/462, 75, 80

[56] References Cited

U.S. PATENT DOCUMENTS

| | | | |
|---|---|---|---|
| 4,661,843 | 4/1987 | Sekizawa et al. | 358/75 |
| 4,937,662 | 6/1990 | Matsunawa et al. | 358/75 |
| 4,958,219 | 9/1990 | Kadowaki | 358/80 |
| 4,969,051 | 11/1990 | Sasaki | 358/462 |
| 4,977,448 | 12/1990 | Murata et al. | 358/80 |
| 4,980,760 | 12/1990 | Hiratsuka et al. | 358/80 |

FOREIGN PATENT DOCUMENTS

| | | |
|---|---|---|
| 0273398A2 | 7/1988 | European Pat. Off. |
| 0388887A3 | 9/1990 | European Pat. Off. |
| 0409474A2 | 1/1991 | European Pat. Off. |
| 3508994A1 | 9/1985 | Fed. Rep. of Germany |
| 1-195775 | 8/1989 | Japan |

OTHER PUBLICATIONS

European Search Report, Application No. 91101479.3, European Patent Office, Sep. 2, 1992.
Shinji Kita, "Theoretical Algorithm of Achromatic Synthesis", pp. 235-250, Xerographic Technology Research Laboratory, Fuji Xerox Co., Ltd. 2274, Hongo, Ebina-shi, Kanagawa, 243-04 Japan.

Primary Examiner—Edward L. Coles, Sr.
Assistant Examiner—Jill Jackson
Attorney, Agent, or Firm—Finnegan, Henderson, Farabow, Garrett & Dunner

[57] ABSTRACT

A color processor for reproducing a color image from color image signals. The processor has a scanner or a generator to obtain color image signals, an A/D converter to generate digital image signals from the color image signal, a density converter to generate density signals from the digital image signals, a controller to control the density converter, and an image reproducer to reproduce a color image according to the density signals. The density converter has a plural conversion data in a ROM memory. Color balance, density control, and picture/character mode change are all performed by selecting data from the conversion data and using the data for the density conversion.

11 Claims, 22 Drawing Sheets (PICTURE MODE)

(CHARACTER MODE)

|  | SCANNER SECTION | | | PRINTER SECTION | | |
|---|---|---|---|---|---|---|
|  | R | G | B | M/A C | M/A M | M/A Y |
| Red | 136 | 48 | 33 | 0 | 0.71 | 0.79 |
| Green | 30 | 61 | 52 | 0.71 | 0 | 1.07 |
| Blue | 30 | 29 | 57 | 0.72 | 0.70 | 0 |
| Cyan | 32 | 84 | 147 | 0 | 0 | 0.87 |
| Magenta | 143 | 50 | 72 | 0 | 0.85 | 0 |
| Yellow | 220 | 194 | 86 | 0.70 | 0 | 0 |
| Black | 24 | 24 | 24 | 0.70 | 0.75 | 0.81 |

FIG. 6

| M/A | 0 | 0.2 | 0.4 | 0.6 | 0.8 | 1.2 |
|---|---|---|---|---|---|---|
| Dr FOR C | 0 | 0.331 | 0.548 | 0.790 | 0.969 | 1.165 |
| Dg FOR M | 0 | 0.292 | 0.451 | 0.592 | 0.680 | 0.811 |
| Db FOR Y | 0 | 0.217 | 0.320 | 0.410 | 0.456 | 0.530 |

| M/A | 0 | 0.16 | 0.3 | 0.5 | 0.8 | 1.3 |
|---|---|---|---|---|---|---|
| D FOR BK | 0 | 0.2 | 0.4 | 0.6 | 0.8 | 1.0 |

FIG. 7

REGION I   $a_{ij}(I)$   $\begin{Bmatrix} 1.3623 & -0.4336 & -0.0655 \\ -0.4606 & 1.3121 & -0.2059 \\ 0.2127 & -1.1619 & 1.3989 \end{Bmatrix}$   Red-Magenta REGION II   $a_{ij}(II)$   $\begin{Bmatrix} 1.4696 & -0.2312 & -0.3752 \\ -0.5047 & 1.2290 & -0.0786 \\ 0.1974 & -1.1908 & 1.4432 \end{Bmatrix}$   Magenta-Blue REGION III   $a_{ij}(III)$   $\begin{Bmatrix} 0.9124 & 0.3043 & -0.3536 \\ -0.8283 & 1.6135 & -0.1395 \\ 0.3351 & -1.3515 & 1.4662 \end{Bmatrix}$   Blue-Cyan REGION IV   $a_{ij}(IV)$   $\begin{Bmatrix} 1.1499 & -0.3408 & 0.0541 \\ -1.1530 & 2.4952 & -0.6965 \\ 0.3942 & -1.5119 & 1.5675 \end{Bmatrix}$   Cyan-Green REGION V   $a_{ij}(V)$   $\begin{Bmatrix} 1.1860 & -0.2164 & -0.1066 \\ -1.2187 & 2.2694 & -0.4052 \\ 0.4650 & -1.2687 & 1.2532 \end{Bmatrix}$   Green-Yellow REGION VI   $a_{ij}(VI)$   $\begin{Bmatrix} 1.3571 & -0.4139 & -0.0801 \\ -0.4916 & 1.4298 & -0.2926 \\ 0.1428 & -0.8965 & 1.2034 \end{Bmatrix}$   Yellow-Red

■ : ORIGINAL
○ : COPY

FIG. 10
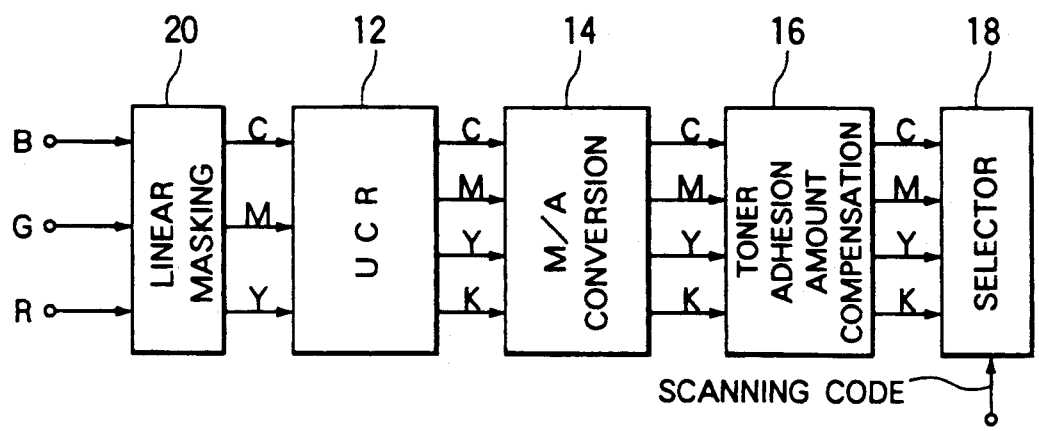
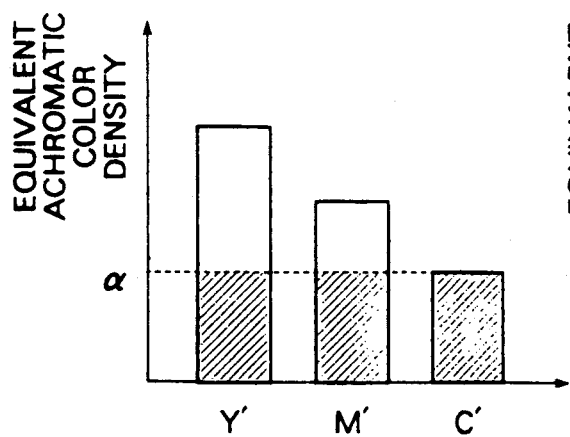
FIG. 11 (A)
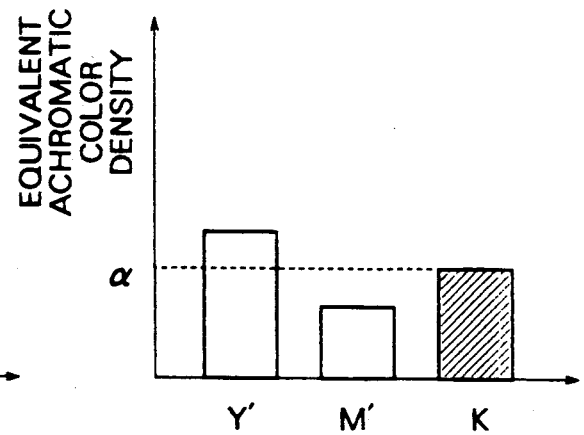
FIG. 11 (B)

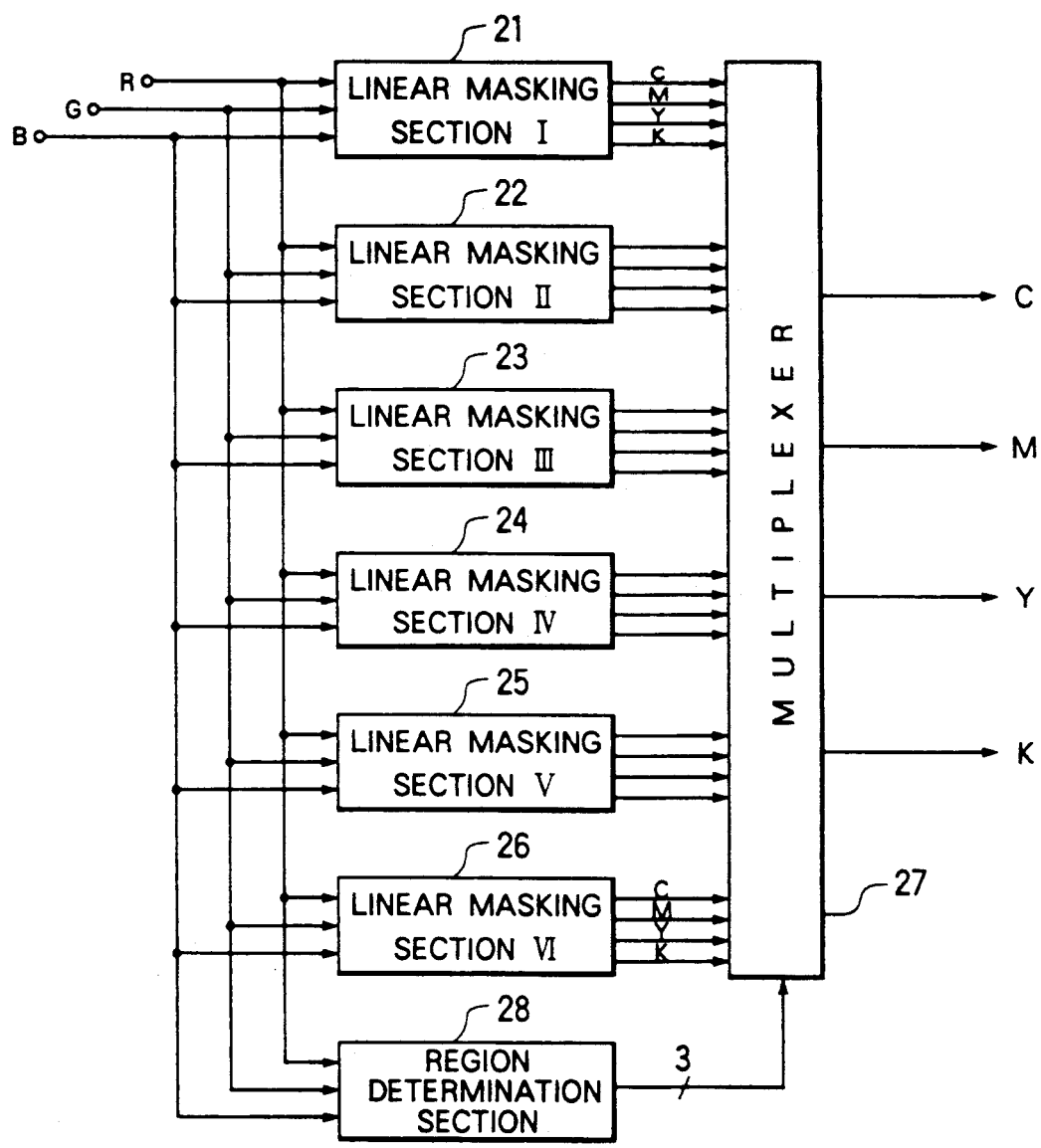

FIG. 17

| SCANNING CODE \ COLOR CODE / MARKING REGION | WHITE 0 0 | CHROMATIC COLOR 1 0 | BLACK 1 1 | |
|---|---|---|---|---|
| | | | INSIDE OF REGION 1 | OUTSIDE OF REGION 0 |
| Y | 0 | 0 | D | 0 |
| M | 0 | 0 | D | 0 |
| C | 0 | 0 | D | 0 |
| K | 0 | 0 | 0 | D |

FIG. 18

| SCANNING CODE \ MARKING REGION | INSIDE OF REGION 1 | OUTSIDE OF REGION 0 | REVERSAL/ SCREENING MODE |
|---|---|---|---|
| Y | DV/D0 | 0 | 0 |
| M | DV/D0 | 0 | 0 |
| C | DV/D0 | 0 | 0 |
| K | 0 | D | D |

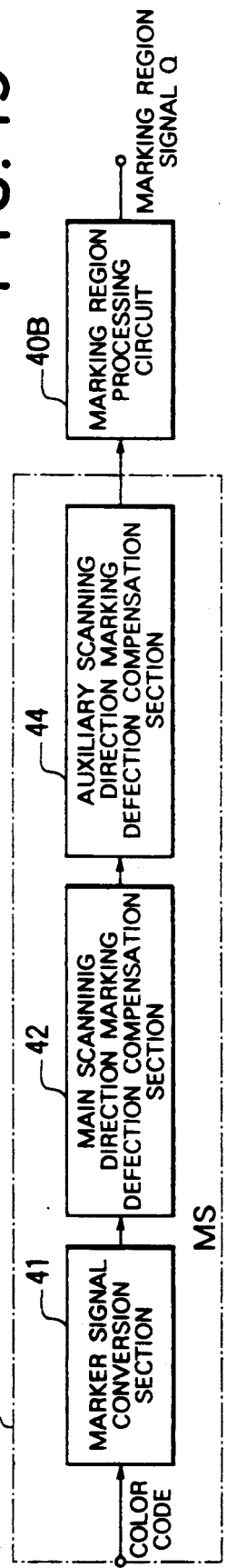
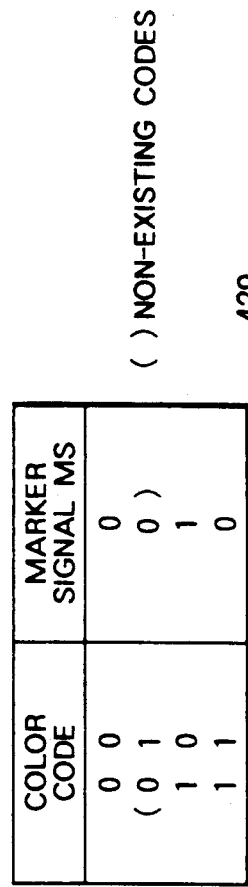
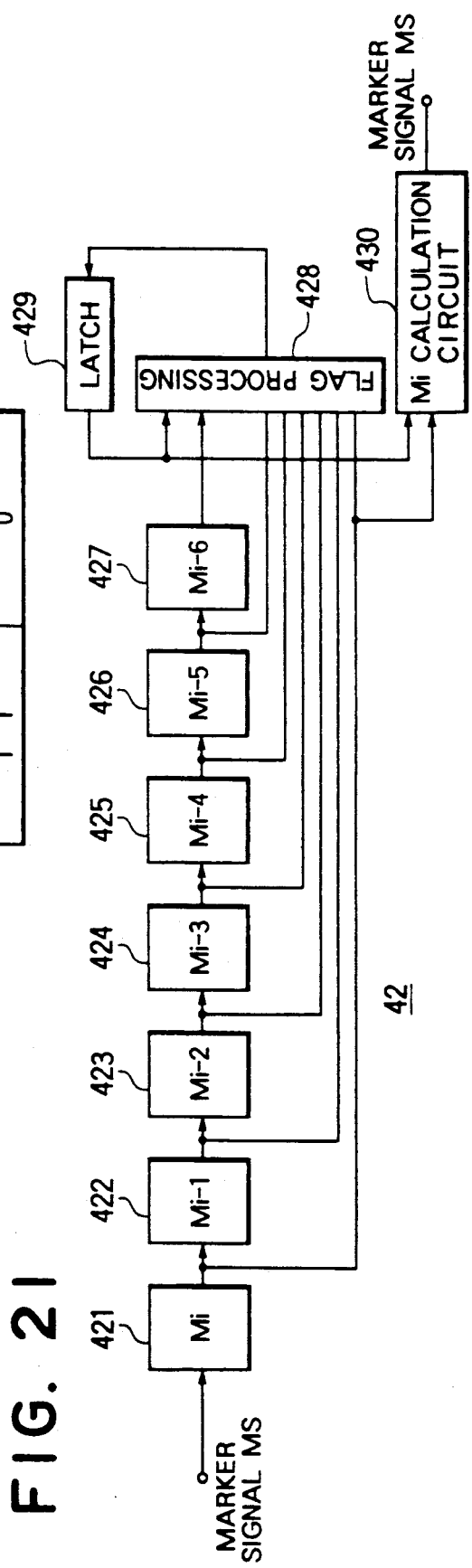

Q : REGION SIGNAL
MS : MARKER SIGNAL

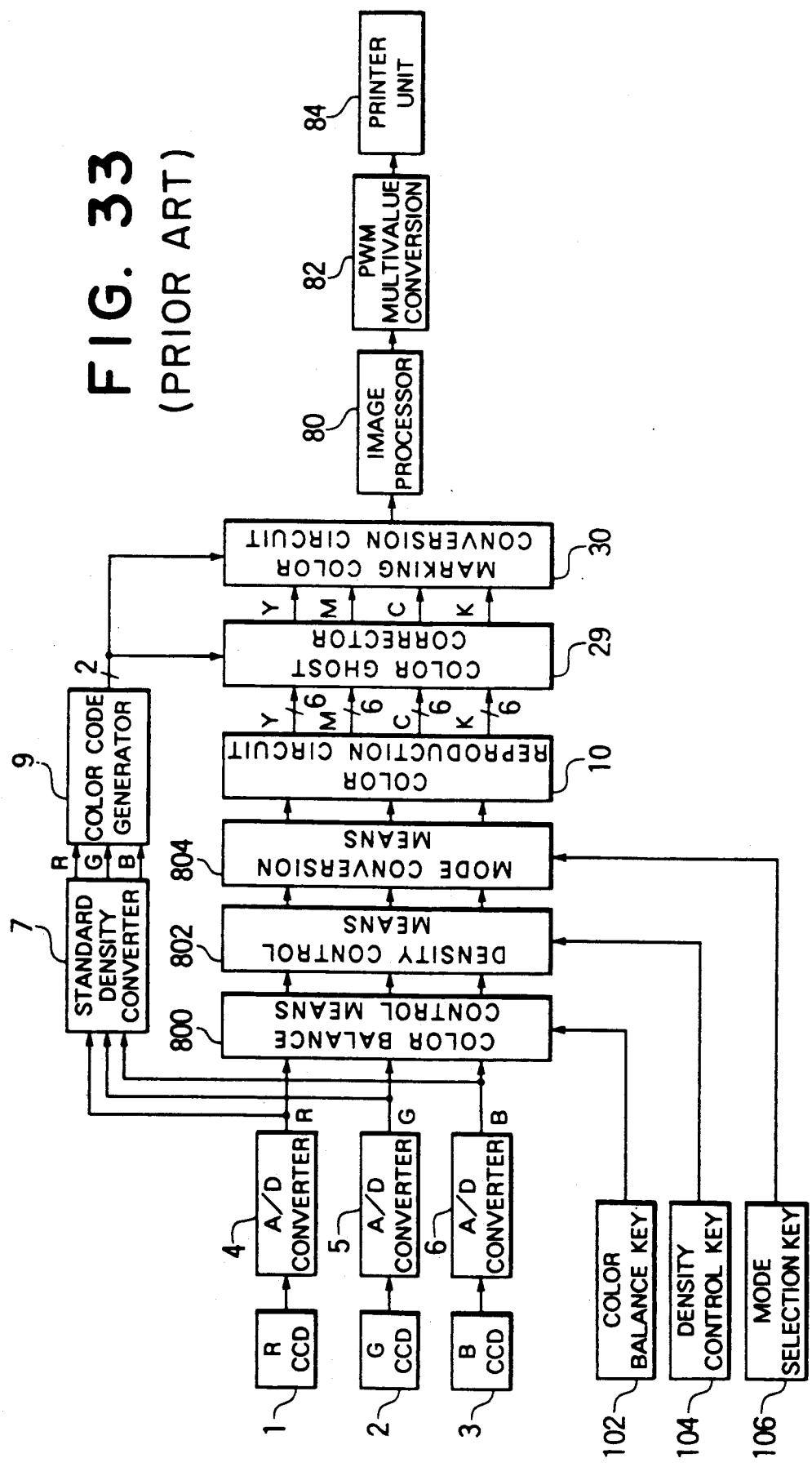

COMPACT COLOR IMAGE PROCESSING APPARATUS WITH ENHANCED DENSITY CONVERSION

BACKGROUND OF THE INVENTION

The present invention relates to a color image processing apparatus for suitable use in a full color copying machine, and more particularly concerns a color image processing apparatus that includes a simplified conversion system for converting an image signal to a density signal.

There have been proposed color image processing apparatuses that optically read a character image, photographic image, or similar color images as divided into a red (R), green (G), and blue (B) colors, convert these colors to recording colors such as a yellow (Y), magenta (M), cyan (C), and black (K) colors, and record on recording paper on the basis of these colors using an output apparatus such as an electronically photographic color copying machine.

FIG. 33 is a block diagram of an example of the color image processing apparatuses. In the figure, number 1 indicates an R CCD which converts a red original image to red image signal, 2 is a G CCD which converts a green original image to green image signal, 3 is a B CCD which converts a blue original image to blue image signal.

The original image information (optical images) is color separated into red, green, and blue colors by a dichroic mirror (not shown), which are focused onto the R CCD 1, the G CCD 2, and the B CCD 3, respectively.

In the figure, number 4 indicates an A/D converter for converting the red image signal read by the R CCD 1 into eight bit digital data, 5 is an A/D converter for converting the green image signal read by the G CCD 2 into eight bit digital data, and 6 is an A/D converter for converting the blue image signal read by the B CCD 3 into eight bit digital data.

In the A/D conversions, also, shading corrections are made on the basis of pickup data of a reference white plate.

In the figure, number 7 indicates a standard density converter for converting the red, green, and blue eight bit digital image signals into six bit digital data, respectively. The digital image signals output of the standard density converter 7 are fed to a color code generator 9 to generate color codes. It should be noted that the standard density converter 7 is used only for generating the color codes.

The color codes are two bit codes to distinguish whether a pixel is white, black, or chromatic color. The two bit codes, for example, are of 00 for white, 11 for black, and 10 for color. Also, the digital image signals are fed to a multi-density conversion system. The multi-density conversion system of the example externally adjusts color balance and density, and selects either picture mode or character mode to adjust image quality.

The digital image signals, outputted from the A/D converters 4, 5, and 6, are first fed to a color balance control means 800. The color balance control means 800 corrects the density data corresponding with the red, green, and blue digital image signals to obtain necessary color balance on the basis of a control signal given from color balance key 102.

In turn, the digital image signals, after the color balance of those are adjusted, are fed to density control means 802. The density control means 802 corrects necessary density data of the red, green, and blue digital signals with a control signal given from a density control key 104.

In turn, mode conversion means 804 feeds out density correction data corresponding to the picture mode or character mode. Selection of any image quality mode is made with mode selection key 106 provided externally.

Through the above-mentioned density control stages are fed out six bit digital density signals. Number 10 indicates a color reproduction circuit that reproduces the colors, including the yellow (Y), magenta (M), cyan (C), and black (K), from the red, green, and blue signals depending on contents of the density signals, and feeds out six bit yellow (Y), magenta (M), cyan (C), black (K).

Number 29 indicates a color ghost corrector that corrects color ghost. This stage is needed against unnecessary color ghost produced around black characters. The color ghost correction is made in the way that a 1×7 window detects any color ghost, and the corrector converts to correct color code a pixel detected as color ghost. The color ghost correction is made in a main scanning direction and an auxiliary scanning direction. Color ghost corrector 29 can be achieved by way of the technique disclosed in the Japanese Patent Laid-Open 1-195775.

Number 30 indicates a marking color conversion circuit that detects areas marked on an original and converts the areas to a marking color. The circuit can feed out a density signal D and a marker area signal Q of the marking color.

Number 80 indicates an image processor that makes image processes such as filter process, magnification process, and shading. Number 82 indicates a PWM multivalue converter that converts the six bit density signal to multivalue in way of pulse width modulation (PWM). Number 84 indicates a printer unit that forms color images in the way that toner images Y, M, C, and K are put one over another on a sensitizing drum (OPC).

In the prior color image processing apparatus mentioned above, the density conversion system that converts the image signals to density signals is complicated in construction as it includes the color balance control means 800, the density control means 802, and mode conversion means 804 accordingly. This results in high cost of the arrangements.

In view of the foregoing, it is a first object of the present invention to provide a color image processing apparatus which includes a simplified density control system, thereby solving the problem mentioned above.

Also, in the prior color image processing apparatus mentioned above, as described above, the image information input from the original is usually converted to red, green, and blue signals. The colors recorded by the printer unit 84, however, are usually yellow, cyan, magenta, and black which are complements to those colors.

The scanner spectral sensitivity and toner spectral reflectance are different as shown in FIG. 34. Red, green, and blue density levels obtained on the basis of scanner levels, therefore, are converted to cyan, magenta, and yellow toner density levels by way of a linear masking method. The linear masking can be expressed as $$\begin{pmatrix} Dc \\ Dm \\ Dy \end{pmatrix} = \begin{pmatrix} a11 & a12 & a13 \\ a21 & a22 & a23 \\ a31 & a32 & a33 \end{pmatrix} \cdot \begin{pmatrix} Dr \\ Dg \\ Db \end{pmatrix} \quad (1a)$$

where Dr, Dg, and Db denote the density levels to which the scanner red, green, and blue luminance levels are converted, respectively; Dc, Dm, and Dy are the density levels to which amounts of the cyan, magenta, and yellow toners are converted; and, aij (i, j = 1, 2, 3) is a masking coefficient.

If the masking coefficient (matrix coefficients) all through a33 are obtained from three sample data C, M, and Y, as an example, the original colors, including cyan, magenta, and yellow, are virtually identical with the ones after copying as seen from a L*a*b* uniform color space system of coordinates in FIG. 35.

However, for the other colors, the conversion errors are marked, as the linear masking method itself is an approximate equation.

Even if the number of sample data is increased, it cannot be expected that the conversion errors will be effectively reduced, as the number of colors that are theoretically treated with the one linear masking matrix is limited to three.

This means that if the color reproduction process is made only by the one linear masking matrix, the color reproduction of a chromatic color is deteriorated in the printer section.

Also, the linear masking process is arranged so that achromatic colors such as black can be fed out as cyan, magenta, and yellow signals having such a density ratio that their equivalent achromatic color densities should be identical.

However, the density ratio of the cyan, magenta, and yellow signals to reproduce an achromatic color is different in a high density portion and a low density portion. If the density ratio of the achromatic color being effective at the low density portion is fed out through the linear masking process mentioned above, for example, it is hard to maintain gray balance at the high density portion. In other words, where there is such a density difference, reproduction of the achromatic color is deteriorated.

In view of the foregoing, it is a second object of the present invention to provide a color image processing apparatus which can improve the reproductibilies of both the chromatic and achromatic colors, thereby solving the problem mentioned above.

SUMMARY OF THE INVENTION

The first object mentioned above is achieved by a color image processing apparatus, including: image reading means that separate an original image into three colors and reads the original image, A/D converters that convert the respective image signals obtained from the image reading means into digital image signals, a multi-density converter that converts the digital image signals to density signals, an adjustment system thereof, and color reproduction means that convert the color separated images read by the image reading means to density data corresponding to recording colors; the multi-density converter comprising memories having density compensation data stored therein to correspond to the respective digital image signals and featured in necessary density compensation data is referred to on the basis of color balance adjustment signals input from the adjustment system.

The memories of the multi-density converter 8, which are ROM 8R, 8G, and 8B in the example, have predetermined density compensation data stored in each.

Signals from the color balance key 102, the density key 104, and the mode key 106 are fed to the CPU 108, which in turn form reference addresses.

The reference addresses are referred as the respective compensation data, and the density signals, compensated according to the key directions, are outputted.

The density conversion section structured with the memories as described above can simplify the apparatus construction, thereby lowering its cost.

The second object mentioned above is achieved by a color image processing apparatus, including:

image reading means that can separate an original image into three colors to read, and color reproduction means that convert the color separated images read by the image reading means to density data corresponding to recording colors;

the color reproduction means including linear masking means and undercolor removing means;

the color reproduction means having matrix masking coefficients for a plurality of linear maskings and selecting one of the plurality of linear maskings with use of the three color separated signals;

the masking coefficient of the selected linear masking being used for linear masking process and for conversion to density data corresponding to recording color; and featuring undercolor removal of the image signal, which has been through the linear masking process, by undercolor removing means.

A color space region, composed of red, green, blue, cyan, magenta, yellow, and black, is divided into a plurality of regions on a system of coordinates. The number of the divided regions is six in total as its center axis is black (K) (FIG. 4).

For the divided regions I through VI are calculated masking coefficients aij (I) through aij (VI) with use of a linear masking method. This allows conversion without error at least of the red, green, blue, cyan, magenta, yellow, and black as shown in FIG. 8. Even the conversion errors for the other regions are small since the divided regions themselves for calculation of the masking coefficients are narrow.

- It is determined which regions the input red, green, blue signals belong, in order to select appropriate masking coefficients in those regions as the masking coefficients at that time.

After the linear masking process, the undercolor removing process (UCR process) is made, as shown in FIG. 10.

For high density portion, the achromatic density ratio of the cyan, magenta, and yellow signals, which is effective in low density portion, is replaced by black toner signal K (FIG. 11). For the reason above, even if there is a density difference, such as in the high and low density portions in an achromatic region, the gray balance in the high density portion can also be precisely kept.

This feature improves the color production characteristic both in the chromatic and achromatic colors.

BRIEF DESCRIPTION OF THE DRAWINGS

FIG. 4 shows a relationship between an L*a*b* system of coordinates and region division. FIGS. 5 through 7 and FIG. 9 are illustrative diagrams of masking coefficients. FIG. 10 is a block diagram for a color reproduction processing circuit. FIGS. 11A and 11B demonstrate the undercolor removal process, and FIGS. 12A, 12B and 12C provide an illustration thereof. FIG. 13 is a block diagram for a linear masking circuit. FIG. 17 and 18 are illustrations thereof. FIG. 19 is a block diagram for a region detection section. FIG. 20 is a color code table. FIG. 21 is a block diagram for a main scanning direction marker break compensation section. FIG. 33 is a block diagram for the prior color image processing apparatus.

DETAILED DESCRIPTION OF EMBODIMENTS

The principles of the present invention will be described in connection with a specific embodiment by referring to figures.

Figure 1:
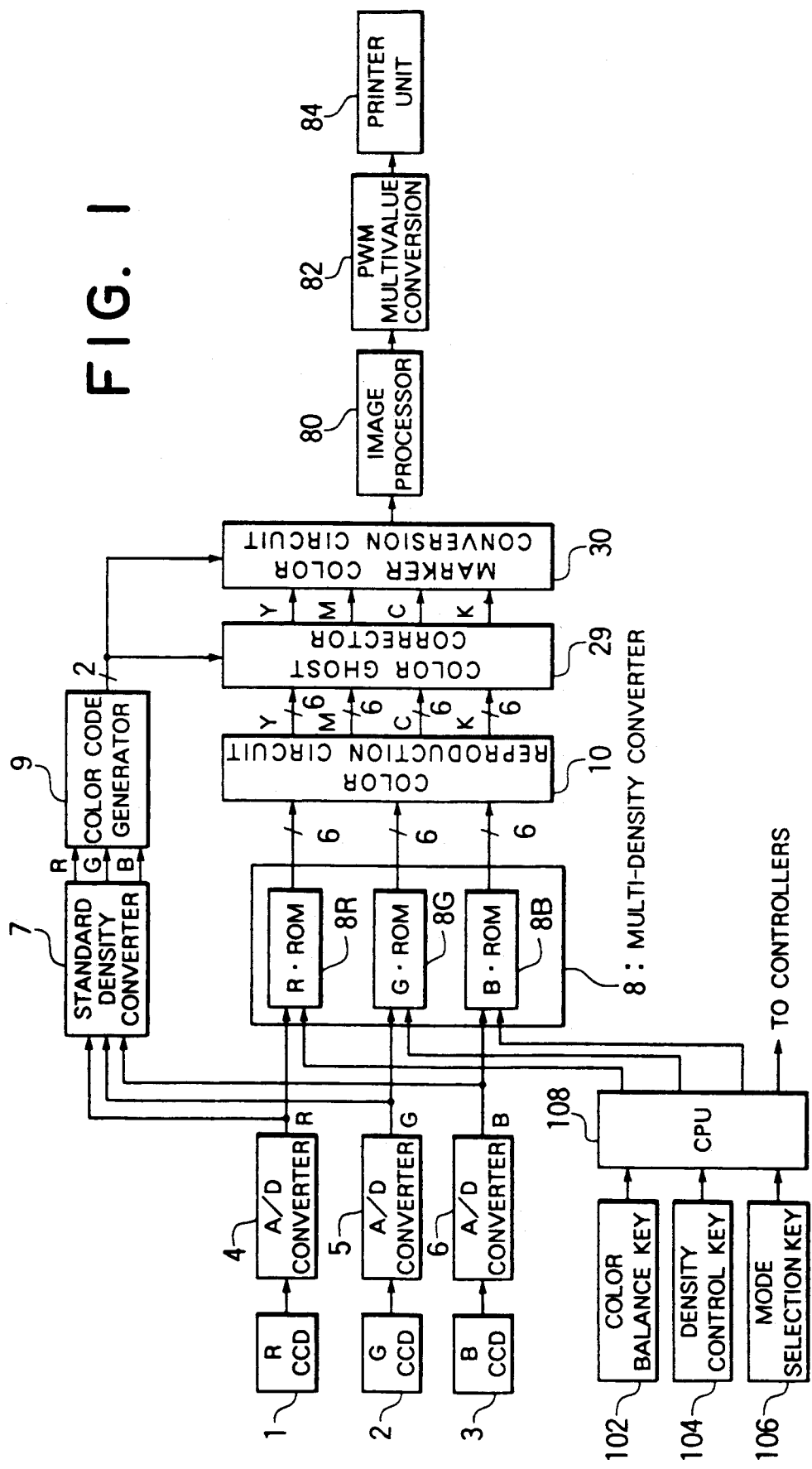
FIG. 1 is a block diagram representing one embodiment of the color image processing apparatus according to the present invention.

FIG. 1 is a block diagram for an embodiment of the color image processing apparatus according to the present invention. The color image processing apparatus of the present invention appears to be similar to the prior apparatus shown in FIG. 33. The same arrangements of the present invention as those of the prior apparatus are omitted in the description here.

In FIG. 1, digital image signals output of A/D converters 4, 5, and 6 are fed to multi-density converter 8, respectively. The multi-density converter 8 comprises memories each of which has density correction data in relation to the digital image signals stored therein. The memories in the embodiment include ROMs 8R, 8G, and 8B.

The embodiment has color balance key 102, density control key 104, and mode selection key 106 that can select color balance, density, and mode (picture, character, or more), respectively. These key signals are fed to CPU 108 that can govern controllers.

The CPU 108 can create reference addresses on the basis of the input data. Correction data stored in the multi-density converter 8 is referenced with the reference addresses, and allow six bit red, green, and blue density signals to be fed out.

Figure 3:
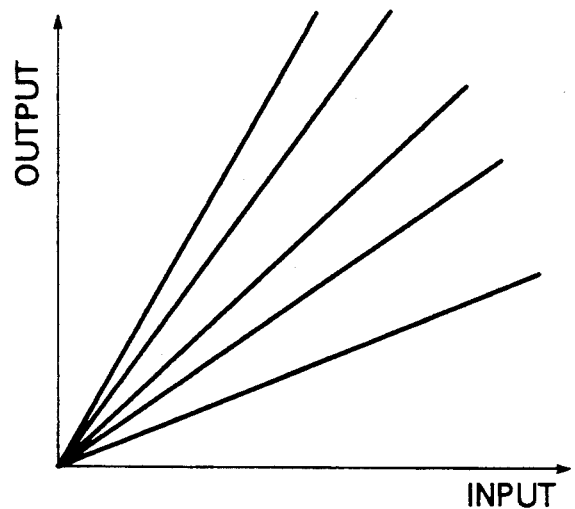
FIGS. 3A and B show multi-density characteristic curves.
Figure 3:
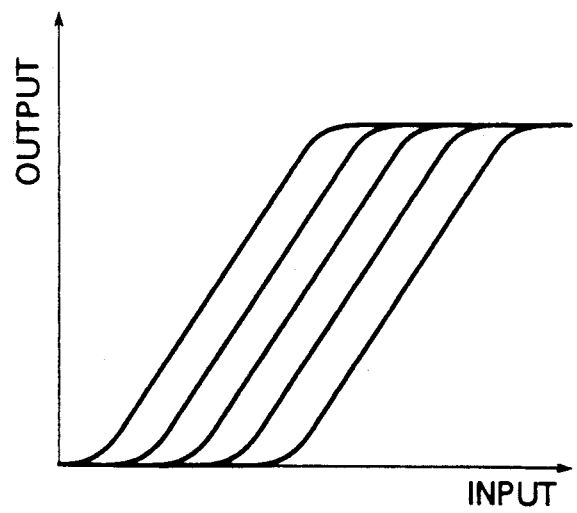

The ROMs 8R, 8G, and 8B provided to correspond to the red, green, and blue colors have the density data shown in FIGS. 3(A) and 3(B). FIG. 3(A) shows the density data used in the picture mode, and FIG. 3(B) is the density data used in the character mode.

The mode selection key 106 can select either mode, and the density control key 104 can select desired red, green, and blue densities from among the specified correction curves to refer to. When the color balance key 102 is adjusted, the ROMs 8R, 8G, and 8B further refer to red, green and blue density data in reference to the already specified red, green, and blue density data. This completes adjustment of the color balance as specified.

Figure 2:
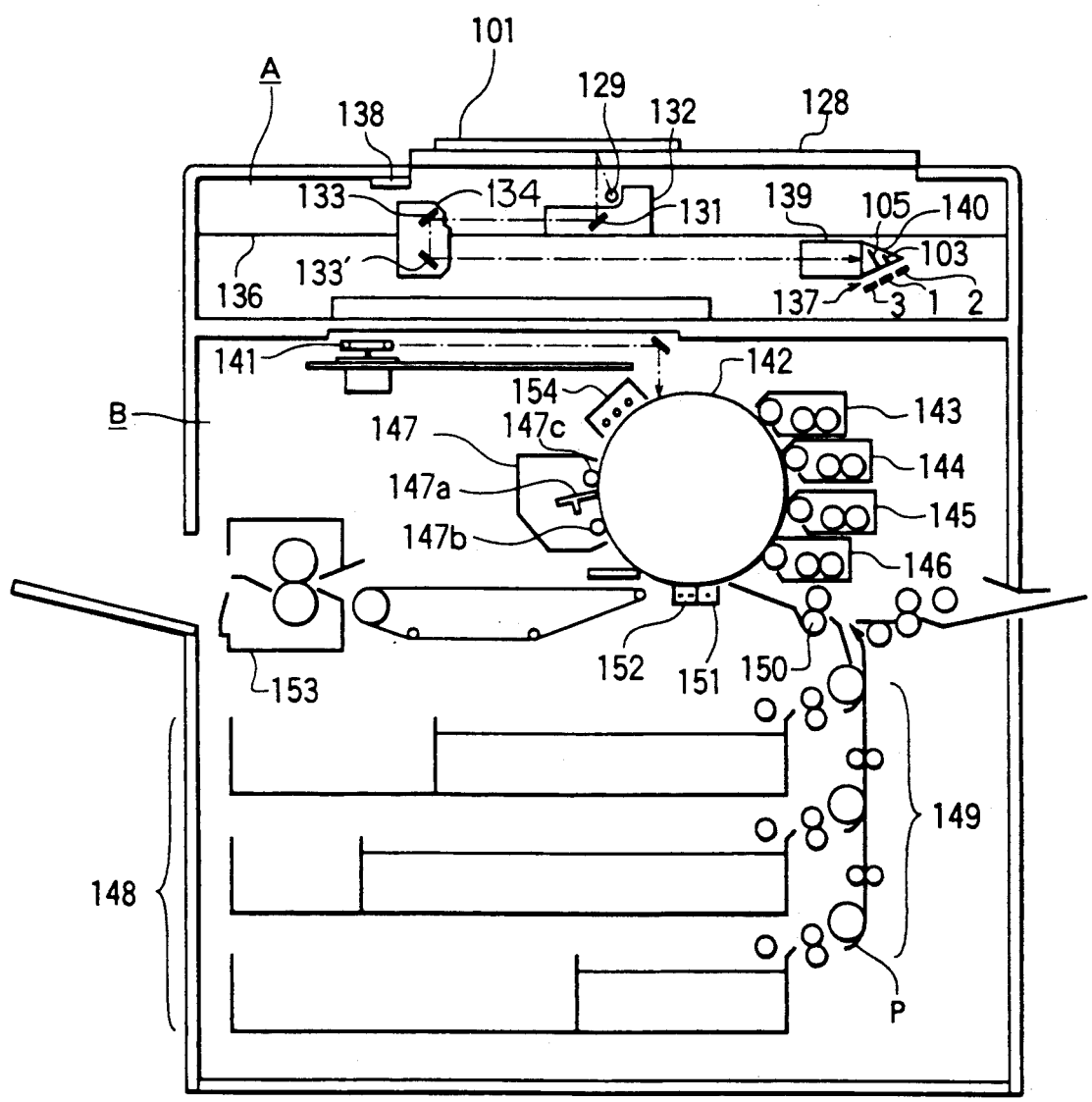
FIG. 2 is an overall construction of a copying machine.

This and the following paragraphs describe the color image processing apparatus shown in FIG. 1 in detail. First described is the overall construction and operation of a copying machine which utilizes the color image processing apparatus of the present invention, as seen in FIG. 2.

For description, as an example, the copying machine uses the color dry development method to copy an original. The example make use of a two-component non-contact development and inversion development method. This method does not have a transfer drum used in the usual color image forming, but makes registration on an electronic photographic sensitizing drum for forming an image.

The example described below is a system arranged small in the way that an image forming OPC sensitizing drum has four color images, including yellow (Y), magenta (M), cyan (C), and black (K) images, developed thereon with it turned four times. Transference is made at a time after development, and the image is transferred onto recording sheet such as plain paper.

In operation, a copy button (not shown) of an operation section of a transfer unit is to be pressed to drive an original reader A. An original 101 on original table 128 can be optically scanned by an optical system.

The optical system comprises carriage 132 having light source 129 such as halogen lamp and reflection mirror 131 and movable mirror unit 134 having V mirrors 133 and 133'. The carriage 132 and the movable mirror unit 134 can be moved on slide rail 136 at a predetermined speed and in a predetermined direction by a stepping motor (not shown).

The optical information (image information) obtained by irradiation of the light source 129 on the original 101 is led to an optical information conversion unit 137 through the reflection mirror 131 and the V mirrors 133 and 133'.

There is provided a reference white plate 138 inside a left-hand portion of the original table 128. The reference white plate 138 is used to normalize the white signal of the image signal as optical scanning is made on the plate.

The optical information conversion unit 137 comprises lens 139, prism 140, two dichroic mirrors 105 and 103, R CCD1 for obtaining red separation image, G CCD2 for obtaining green separation image, and B CCD3 for obtaining blue separation image.

The optical signal obtained through the optical system is focused through the lens 139, and is color separated into blue optical information and yellow optical information by the dichroic mirror 105 arranged inside the prism 140 mentioned above. The yellow optical information further is color separated into red optical information and green optical information by the dichroic mirror 103. The prism 140, as described above, can separate the color optical image into three color optical informations, red, green, and blue.

Each of the color separated images is focused onto receiving faces of the respective CCDs, which can convert them to electrical image signals. The image signals are signal processed through the signal processing system described previously. Each recording color image signal is fed out to writing section B.

The writing section B (printer unit 84) has a deflector 141. The deflector 141 may be a galvano mirror, a revolving multiface mirror, a deflector comprising an optical polarizer of crystal, or the like. A laser beam modulated with the color signal is irradiated by deflector 141.

When the deflection scanning is started, a laser beam index sensor (not shown) detects beam irradiation so that beam modulation is started from the first color (for example, yellow signal). The modulated beam is irradiated onto an image forming body (photosensitive drum) 142 having uniform charge thereon (by charger 154.).

The image forming body 142 has an electrostatic latent image corresponding to the first color signal formed thereon with the irradiation movement of the laser beam in the main direction and the rotation of the image forming body 142 in the auxiliary direction.

The electrostatic latent image can be developed by developing unit 143 having yellow toner contained therein to form yellow toner image. It should be noted that the developing unit 143 has a predetermined developing bias voltage applied thereto from a high voltage power supply.

Supply of the toner to the developing unit can be appropriately made in a way that a toner supply means (not shown) is controlled on the basis of a command signal from a system control CPU (not shown).

The yellow toner image mentioned above is turned in a state that cleaning blade 147a is released. Another electrostatic latent image, similarly, is formed on the basis of a second color signal (for example, magenta signal). Developing unit 144 containing magenta toner is used to develop the electrostatic latent image to form a magenta toner image.

It is a matter of course that the developing unit 144 has a predetermined developing bias voltage applied thereto from the high voltage power supply.

Similarly, another electrostatic latent image is formed on the basis of a third color signal (for example, cyan signal). Developing unit 145 containing cyan toner is used to develop the electrostatic latent image to form a cyan toner image.

Also, the other electrostatic latent image, similarly, is formed on the basis of a fourth color signal (black signal). Developing unit 146 containing black toner is used to develop the electrostatic latent image to form a black toner image.

As a result, the image forming body 142 has a multiple of color toner images formed one over another thereon.

It is a matter of course that forming two color or monochrome toner image is made in similar manner, although forming the four color toner images has been described above.

Developing process is made in the so-called non-contact two-component jumping development that the toners are splashed toward the image forming body 142 to develop with the AC and DC bias voltages being applied thereto from the high voltage power source as described above.

The toner supplied to the developing units 143, 144, 145, and 146 are made to have predetermined amounts according to the command signal from the CPU in a similar way as above.

On the other hand, the recording paper P is fed from paper feed unit 148 through feed roll 149 and timing roll 150. It, in turn, is carried onto the image forming body 142 in a state that it is synchronized with the rotation of the image forming body 142. It, then, has the multi-color toner image transferred onto the recording paper P by transfer electrode 151 being applied a high voltage from the high voltage power source. After the transfer, the recording paper P is separated by separation electrode 152.

The separated recording paper P is carried to fixing unit 153 in which it is subjected to fixing process to produce color image.

The image forming body 142 which has completed the transference is cleaned by cleaning unit 147, and stands by for next image forming process In the cleaning unit 147, metal roll 147b is applied a predetermined DC voltage in order to make easy collection of the toner removed by the cleaning blade 147a. The metal roll 147b is arranged in a non-contact state to a surface of the image forming body 142. The cleaning blade 147a is made free from pressing after cleaning is ended. With the release of the blade, residual unnecessary toner can be completely removed by the auxiliary roller 147c which is additionally provided to revolve in a direction opposite to that of the image forming body 142 and to be pressed to the image forming body 142.

Now, referring to FIG. 1, the multi-density converter 8 is made of the ROMs 8R, 8G, and 8B having the density data corresponding to red, green, and blue, respectively. Each of the ROMs has the density data as shown in FIGS. 3(A) or 3(B).

FIG. 3(A) shows the density data used in the picture mode, and FIG. 3(B) is the density data used in the character mode.

The mode selection key 106 is to select either picture or character mode, and the density control key 104 is to select desired red, green, and blue densities from among the specified correction curves to refer to.

The color code generator 9 generates two bit color code. The color reproduction circuit 10 generates six bit yellow, magenta, cyan, and black density signals.

In other words, the color code generator 9 generates the two bit color code that indicates which color region (white, black, or chromatic color) a pixel belongs to, according to the data level of the red, green, or blue. The color code, for example, is 00 for white, 11 for black, and 10 for chromatic color (see FIG. 20). The following paragraphs describe a process of generating the color code.

(1) Generation of white code

First, the red, green, and blue signals are converted to an XYZ system of coordinates by the Eq. (1) below.

$$\begin{pmatrix} X \\ Y \\ Z \end{pmatrix} = \begin{pmatrix} 0.6580 & 0.0838 & 0.1812 \\ 0.3279 & 0.6158 & -0.0027 \\ -0.0087 & -0.3369 & 1.4888 \end{pmatrix} \cdot \begin{pmatrix} R \\ G \\ B \end{pmatrix} \quad (1)$$

The XYZ system of coordinates is converted to the uniform color space L*a*b* by Eqs. (2), (3), and (4) below.

$$L^* = 116(Y/Y_o)^{\frac{1}{3}} - 16 \quad (2)$$

$$a^* = 500\{[(X/X_o)^{\frac{1}{3}} - (Y/Y_o)^{\frac{1}{3}}]\} \quad (3)$$

$$b^* = 200\{[(Y/Y_o)^{\frac{1}{3}} - (Z/Z_o)^{\frac{1}{3}}]\} \quad (4)$$

where $Y_o = 100$, $X_o = 97.07$, and $Z_o = 118.23$.

In the uniform color space L*a*b* obtained as above, $L^* \geq 90$ is defined as white region.

(2) Generation of achromatic color (black) code

First, the red, green, and blue signals are used to obtain QK by Eq. (5) below.

$$QK = \sqrt{\{(R - Wo)^2 + (G - Wo)^2 + (B - Wo)^2\}/(W \cdot Wo)} \quad (5)$$

In the QK parameter obtained as above, $QK \geq 15$ is defined as black region.

(3) Generation of chromatic color code

The chromatic color code is set for the chromatic color region being defined as a region other than the white region and black region.

The color reproduction circuit 10 converts the red, green, and blue signals to yellow, magenta, cyan, and black signals, since the scanner spectral sensitivity characteristic is different from the toner spectral reflectance. The red, green, and blue density levels obtained in terms of the scanner levels are converted to cyan, magenta, yellow toner density levels by way of the linear masking method (see Eq. (1)).

In the present invention, the masking coefficients are calculated as follows. Seven sample colors, including red, green, blue, cyan, magenta, yellow, and black, are used to divide the color space into six regions from I to VI, as shown in the uniform color space system of coordinates L*a*b* in FIG. 4.

In turn, using three vertex colors in the divided regions, the masking coefficients aij to be used in the regions are calculated by the equations mentioned previously. The masking coefficient aij (I) for the region I, as an example, is calculated as the region I consists of red, black, and magenta. A calculation example is described below.

The red, green, and blue luminance levels obtained through the scanner section are converted to density levels by means of the following calculation equations (6), (7), and (8).

$$Dr = -(64/1.5) \log_{10} \{(R+0.5)/256\} \quad (6)$$

$$Dg = -(64/1.5) \log_{10} \{(G+0.5)/256\} \quad (7)$$

$$Db = -(64/1.5) \log_{10} \{(B+0.5)/256\} \quad (8)$$

For the cyan, magenta, and yellow, the amounts of toners to adhere are converted to density levels by means of a curve of monochrome density to amount of toner adhesion (not shown).

Figures 4, 5:
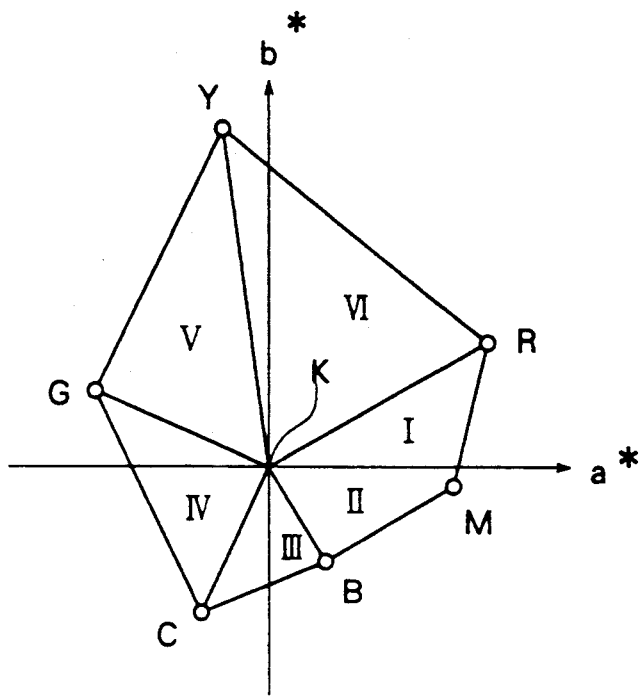

FIG. 5 shows red, green, and blue scanner levels (luminance levels) of actual measurement and they are used for calculating the masking coefficients in use with the seven colors of red, green, blue, cyan, magenta, yellow, and black. FIG. 5 also shows the measured amounts (M/As) of the toner adhesion of cyan, magenta, and yellow. In order to represent the colors on the left column, in other words, the scanner section of red, green, and blue makes use of the luminance levels shown, and the printer section of cyan, magenta, and yellow uses the adhesion amounts of toners shown.

FIG. 6 shows a relationship between the adhesion amounts of toner and density levels Dr, Dg, and Db.

The masking coefficients aij(I) to aij(VI) can be calculated from FIG. 5, the relationship in FIG. 6, and Eqs. (6) through (8) so that the red, green, and blue coincide with the cyan, magenta, and yellow. FIG. 7 is an example of the masking coefficients in the regions I through VI calculated as described above.

As a result, it was found that at least seven colors, red, green, blue, yellow, magenta, cyan, and black could fully coincide with those even after conversion. For the color within each divided region, it is not very significant even if there is conversion error as the divided region itself is narrow.

Figure 8:
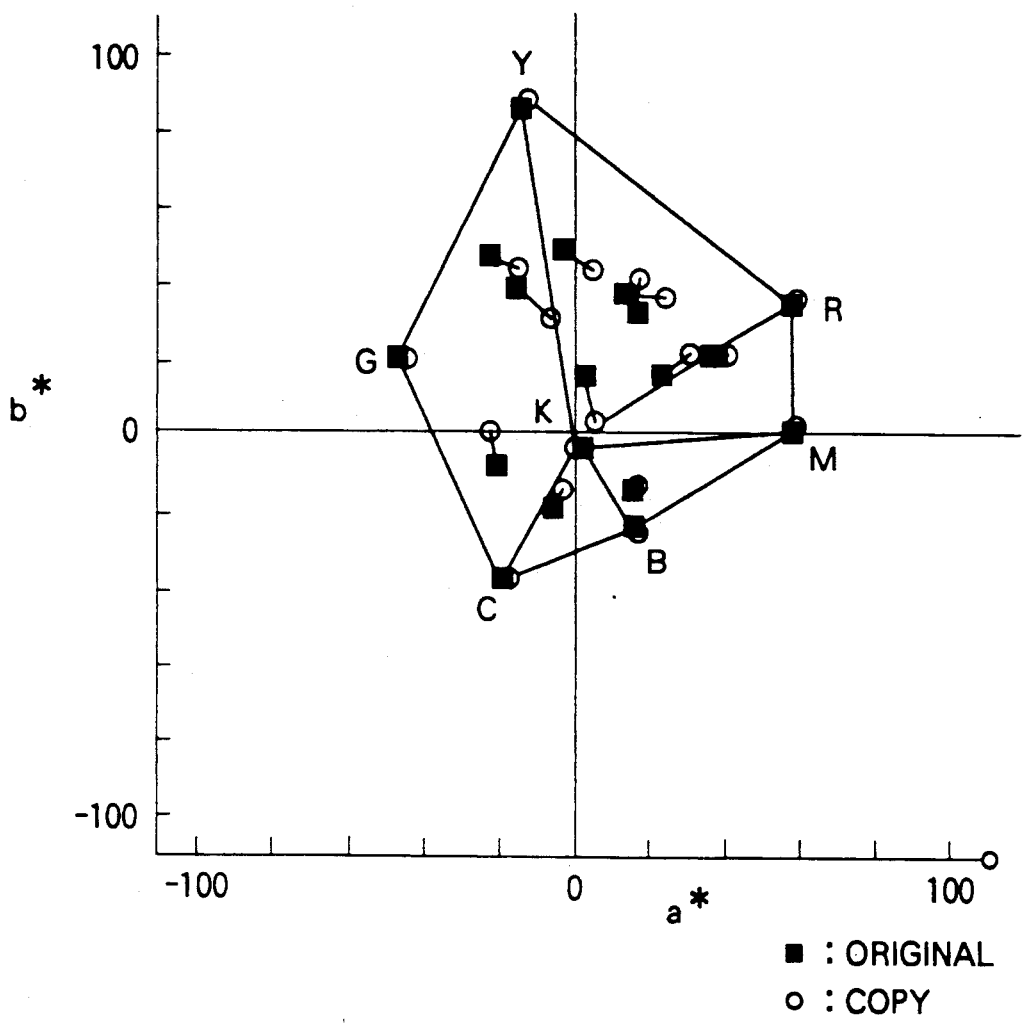
FIG. 8 is an illustration of the L*a*b* system of coordinates.

Therefore, it can be said that with calculation of the masking coefficients by the region division method, the conversion error can be minimized as shown in FIG. 8. This means that the color reproduction characteristic for chromatic colors is improved.

However, there is a problem of discontinuity of conversion color on a boundary of two divided regions for which the masking coefficients are calculated. The problem is analyzed for the boundary of regions I and II as follows. This can apply to the other boundaries.

First, an equation of a plane on the boundary is determined. It then is substituted for the linear maskings of the regions I and II. If both are equal, all the values on the boundary plane are equal. This proves that the colors converted on the boundary plane are continuous.

Figure 9:
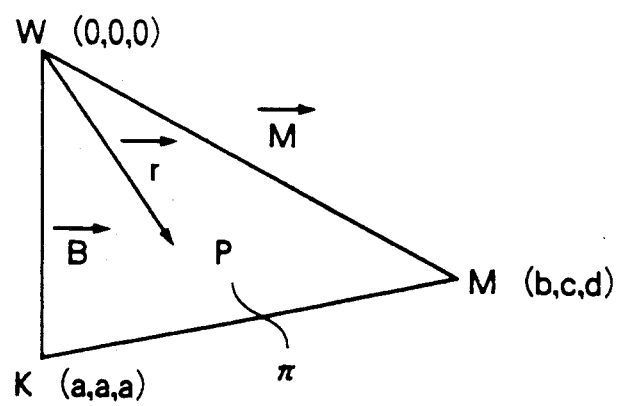

The boundary plane $\pi$ of the regions I and II is a plane passing through the three points of white, magenta, and black, as shown in FIG. 9. A plane equation of any point on the plane $\pi$ with its vector from the origin being denoted by r is $$r = \alpha B + \beta M \quad (9a)$$

The vector r can be expressed as magnitudes (density levels) as $$(Dr, Dg, Db) = \alpha(a, a, a) + \beta(b, c, d) \quad (9b)$$

where $\alpha$ and $\beta$ are arbitrary real numbers. If the values shown in FIGS. 5 through 7 are substituted for a, b, c, and d, then $$Dr = 1.028\alpha + 0.253\beta \quad (10)$$

$$Dg = 1.028\alpha + 0.709\beta$$

$$Db = 1.028\alpha + 0.551\beta$$

If this is substituted for the masking matrix of the region I, then $$\begin{pmatrix} C \\ M \\ Y \end{pmatrix} = \begin{pmatrix} 1.3623 & -0.4336 & -0.0655 & 1.028 + 0.253\beta \\ -0.4606 & 1.3121 & -0.2059 & 1.028 + 0.709\beta \\ 0.2127 & -1.1619 & 1.3989 & 1.028 + 0.551\beta \end{pmatrix} \quad (11)$$

$$= \begin{pmatrix} 0.889 & 0.001 \\ 1.665 & 0.700 \\ 0.463 & 0.001 \end{pmatrix} \begin{pmatrix} \alpha \\ \beta \end{pmatrix}$$

If it is substituted for the masking matrix of the region II, then $$\begin{pmatrix} C \\ M \\ Y \end{pmatrix} = \begin{pmatrix} 1.4696 & -0.2312 & -0.3752 & 1.028 + 0.253\beta \\ -0.5047 & 1.2290 & -0.0789 & 1.028 + 0.709\beta \\ -0.1974 & -1.1908 & 1.4432 & 1.028 + 0.551\beta \end{pmatrix} \quad (12)$$

$$= \begin{pmatrix} 0.889 & 0.001 \\ 0.665 & 0.700 \\ 0.463 & 0.001 \end{pmatrix} \begin{pmatrix} \alpha \\ \beta \end{pmatrix}$$

As shown above, the values on the boundary plane $\pi$ are consistent for the masking coefficients aij(I) in the region I and for the masking coefficients aij(II) in the region II. Accordingly, there occurs no discontinuity of conversion colors on the boundary plane $\pi$.

FIG. 10 is an example of the color reproduction circuit 10 described previously. The red, green, and blue signals (luminance levels) are subjected to the color reproduction process described above by a linear masking 20. The converted cyan, magenta, and yellow then are processed by an undercolor removing means 12 so that their black components (undercolor) can be replaced by the black toner signal K. The reasons for the undercolor removing process are as follows.

Firstly, if the cyan, magenta, and yellow toners are put one over another to represent black, it is hard to obtain full black as they contain unnecessary reflection components. In addition, this means that the color reproduction region is made narrow.

Secondly, it is hard to make high density black produced by putting the cyan, magenta, and yellow toners one over another.

Thirdly, if there is a density difference in the achromatic region, gray balance cannot be made in between the high density portion and low density portion.

In the linear masking process described above, the achromatic colors, such as black, are fed out as the cyan, magenta, and yellow signals, the density ratio of which is made equal to the equivalent achromatic densities.

However, the actual high density portion and low density portion have different density ratios of the cyan, magenta, and yellow signals to reproduce the achromatic colors. As such, if the density ratio in an achromatic color, which is effective in the low density portion, is fed out through the linear masking process described above, for example, the gray balance can be kept in the high density portion.

The undercolor removing process allows the cyan, magenta, and yellow signals of the achromatic density ratio effective in the low density portion to be replaced by the black toner signal K in the high density portion (FIG. 11). It is therefore desirable that the gray balance is precisely made even in the high density portion, thereby improving the reproduction of the achromatic colors.

Now, the following describes the undercolor removing means 12. First, the equivalent achromatic densities $C'$, $M'$, and $Y'$ for cyan, magenta, and yellow can be obtained as follows.

$$C' = \alpha C \quad (13)$$

$$M' = \beta M$$

$$Y' = \gamma Y$$

This equation represents that if the cyan density is C, for example, the lack density obtained by adding proper amounts of magenta (M) and yellow (Y) to the cyan is $C'$. This applies to the magenta $M'$ and yellow $Y'$. The coefficients $\alpha$, $\beta$, and $\gamma$ can be obtained by way of the following Eq. (14) with one of the six masking coefficients selected.

$$\begin{pmatrix} 1/\alpha \\ 1/\beta \\ 1/\gamma \end{pmatrix} = \begin{pmatrix} a11 & a12 & a13 \\ a21 & a22 & a23 \\ a31 & a32 & a33 \end{pmatrix} \begin{pmatrix} 1 \\ 1 \\ 1 \end{pmatrix} \quad (14)$$

where a11 through a33 are the masking coefficients in the divided regions I through VI.

The minimum one of $C'$, $M'$, and $Y'$ represents the density of the black component (undercolor). It can be replaced by the black toner density K as follows.

$$K = \min(C', M', Y') \quad (15)$$

where min ( ) is a function to obtain the minimum value in ( ). The black component (undercolor) can be removed from the cyan, magenta, and yellow in a way that the equivalent achromatic density has the black component density subtracted therefrom, and the result is divided by the coefficients $\alpha$, $\beta$, and $\gamma$ mentioned above.

$$C = (C' - K)/\alpha \quad (16)$$

$$M = (M' - K)/\beta$$

$$Y = (Y' - K)/\gamma$$

With this undercolor removing process made, C, M, Y, and K are fed out.

FIGS. 11A and 11B illustrate the undercolor removing process. This example makes reference the cyan (C), (shaded in FIG. 11A, having the minimum equivalent achromatic color density to remove $C'$, $M'$, and $Y'$ of that density. This shows the 100% UCR that is replaced by the black K, as shown in FIG. 11B.

After the undercolor removing process, the density levels are converted to toner adhesion amounts M/A by the M/A converter 14 shown in FIG. 10, and are corrected by a toner adhesion amount compensation 16.

Figure 12:
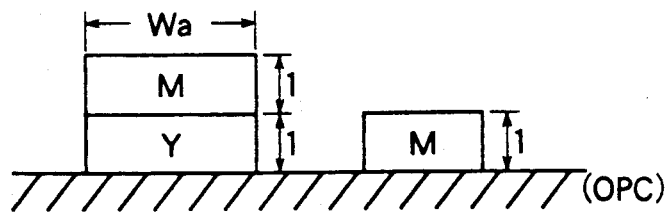
Figure 12:
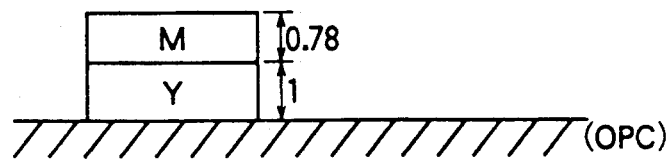
Figure 12:
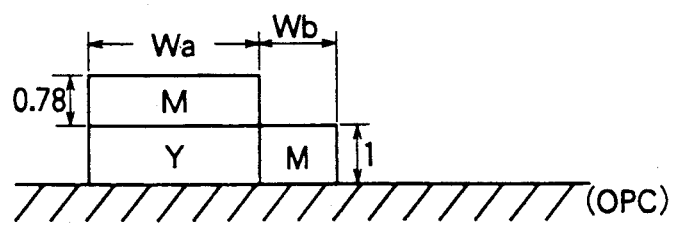

That is, it is desired that if Y and M are written one over the other, for example, with a writing pulse width being Wa in the printer unit 84 as shown in FIG. 12(A), the Y and M toner adhesion amounts should be essentially equal. The actual M toner adhesion amount, however, becomes around 78% of that upon monochrome as shown in FIG. 12(B).

The writing pulse width of M is made to be Wb wider than the writing pulse width of Y, as shown in FIG. 12(C), to make the M toner adhesion amount equal to that upon monochrome. This can correct variation of the toner adhesion amount to the sensitizing drum (OPC).

A selector 18 can select one of the cyan, magenta, yellow, and black corrected in the toner adhesion amounts to feed out. Since the printer unit 84 scans the colors one by one to put one over another to develop as described previously, it is necessary to synchronize the cyan, magenta, yellow, and black with the scanning colors to feed out. The selector 18, therefore, has a two bit scan code fed thereto.

FIG. 13 shows an example of the linear masking 20. When divided into six regions as shown in FIG. 4, there are provided linear masking sections 21 through 26 having the masking coefficients aij(I) through aij(VI) stored therein. A region determination section 28 and multiplexer 27 can select the cyan, magenta, yellow, and black signals output of the linear masking sections.

A region determination section 28 receives the red, green, and blue signals to determine which regions they belong to. The determination output signal is used to select one of the linear masking sections 21 through 26.

Figure 14:
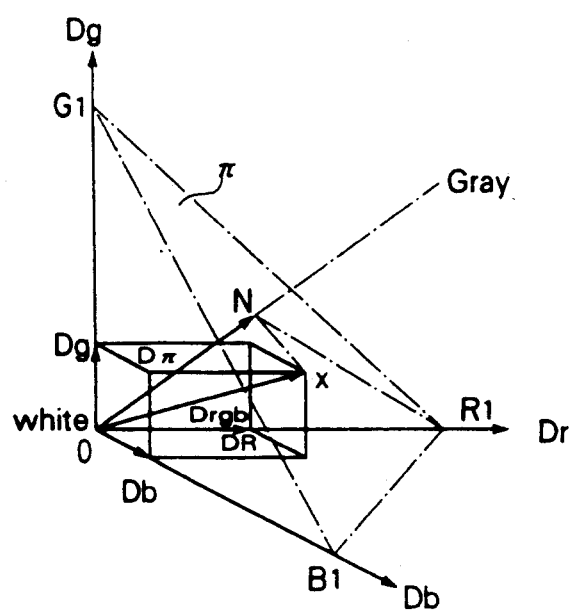
FIGS. 14A and 14B demonstrate the linear masking theory.
Figure 14:
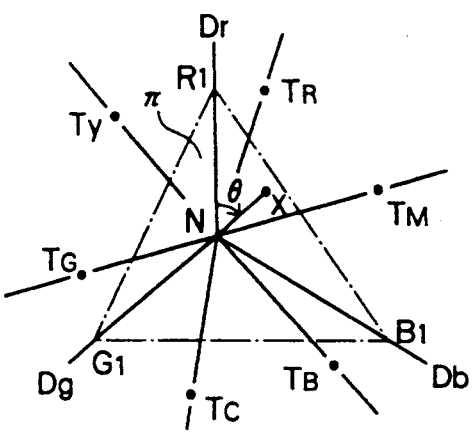

The linear masking 20 can be made of a single ROM table. The region determination section 28 can be made as follows. FIG. 14A is an orthogonal system of coordinates Dr, Dg, and Db. Let the densities on the scanner side be $D_r$, Dg, and Db. These can be represented as $D_{RGB}(OX)$.

The plane $\pi$ which includes point X is orthogonal to vector $\vec{ON}$ denoting the achromatic color. Let components of the achromatic color vector be r, g, and b. These feature as $$r = g = b = k \tag{17}$$

Thus, $$\vec{ON} = (k, k, k) \tag{18}$$

where k is a real number.

If N is on the plane $\pi$, this meets the following condition.

$$\vec{ON} \perp \vec{NX} \tag{19}$$

That is, $$\vec{ON} \cdot \vec{NX} = 0 \tag{20}$$

It can be expressed in its components as $$\vec{ON} \cdot (\vec{OX} - \vec{ON}) = 0 \tag{21}$$

$$(k, k, k) \cdot \{(Dr, Dg, Db) - (k, k, k)\} = 0$$

$$(k, k, k) \cdot (Dr - k, Dg - k, Db - k) = 0$$

$$k\{Dr + Dg + Db - 3k\} = 0$$

As $k = 0$, $$k \neq (Dr + Dg + Db)/3 \tag{22}$$

As a point on the plane $\pi$ satisfies the above equations, the intersection points $R_1$, $G_1$, and $B_1$ of the plane $\pi$ and the axes are expressed as:

$$R_1(3k, 0, 0), G_1(0, 3k, 0), B_1(0, 0, 3k) \tag{23}$$

FIG. 14B shows how the plane $\pi$ looks from an extension line of $\vec{ON}$. $R_1$, $G_1$, $B_1$, X, and N are all on the plane $\pi$. Let N be the center, and the angle of $\vec{NR}$ be 0 degree. Then, the angle $\theta$ of $\vec{NX}$ can be expressed as i) when Dg > Db, $$\theta = \cos^{-1}(\vec{NR_1} \cdot \vec{NX}/|\vec{NR_1}||\vec{NX}|) \tag{24}$$

ii) when Dg < Db, $$\theta = -\cos^{-1}(\vec{NR_1} \cdot \vec{NX}/|\vec{NR_1}||\vec{NX}|) \tag{25}$$

If it is expressed by its components:

$$NR_1 = OR_1 - ON = (3k, 0, 0) - (k, k, k) = (2k, -k, -k)$$

$$NX = OX - ON = (D_R, D_G, D_B) - (k, k, k)$$
$$= (D_R - k, D_G - k, D_B - k)$$

$$NR_1 \cdot NX = (2k(D_R - k), -k(D_G - k), -k(D_B - k))$$
$$= k(2D_R - D_G - D_B)$$

$$|NR_1||NX| = k\sqrt{6}\sqrt{(D_R - k)^2 + (D_G - k)^2 + (D_B - k)^2}$$

when $D_g > D_b$ $$\theta = \cos^{-1}[(2D_R - D_G - D_B)/\sqrt{6}\sqrt{(D_R - k)^2 + (D_G - k)^2 + (D_b - k)^2}]$$

when $D_g < D_b$ $$\theta = -\cos^{-1}[(2D_R - D_G - D_B)/\sqrt{6}\sqrt{(D_R - k)^2 + (D_G - k)^2 + (D_b - k)^2}]$$

However, when Dr = Dg = Db,
$\theta = 0$ because $\theta$ is indefinite.

For the purpose, angles $\angle R_1 NTM$, $\angle R_1 NTB$, and so on corresponding to the C, M, Y, R, G, B toner images can be obtained in advance, and the six regions I through VI can be sectioned by these angles. This allows determination of the six regions I through VI by obtaining $\theta$ in terms of the input signals R, G, and B and by obtaining relative angle sizes.

The marker color conversion is a process that an area enclosed by the marker for black characters on an original is converted to the same color as the marker.

Figures 15A, 15B:
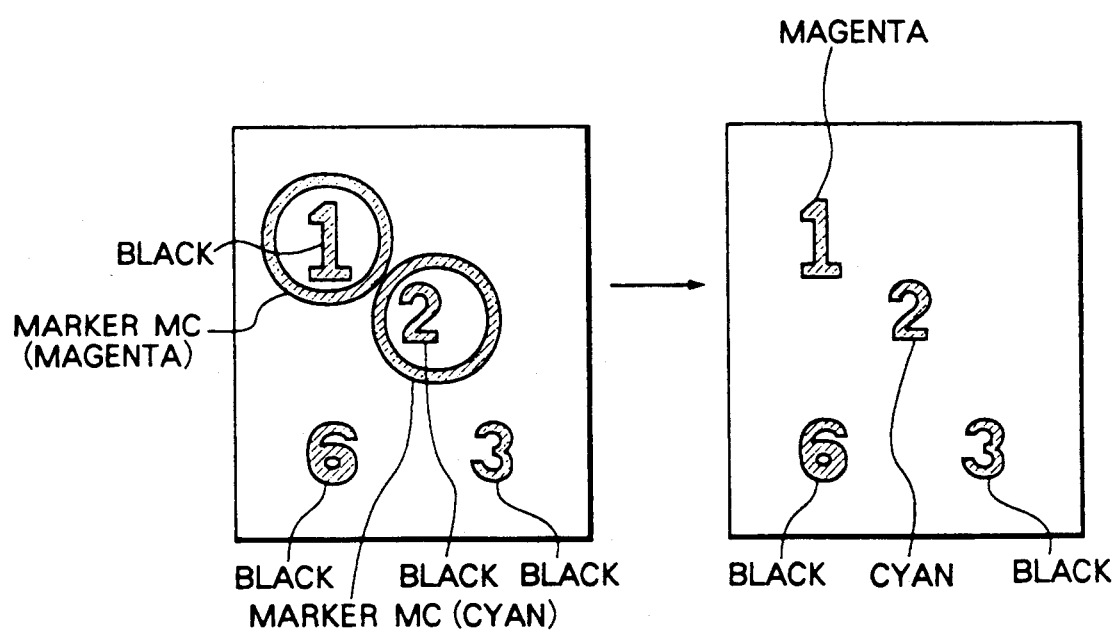
FIGS. 15A and 15B are illustrations of a marker conversion process.

FIGS. 15A and 15B illustrate the marker color conversion. FIG. 15A is an original before the marker color conversion, and FIG. 15B is an output result recorded by the marker color conversion. The portions enclosed by the color marker, as shown in the figure, is formed in the same color as the marker. The color of the used marker MC is not specifically limited.

Figure 16:
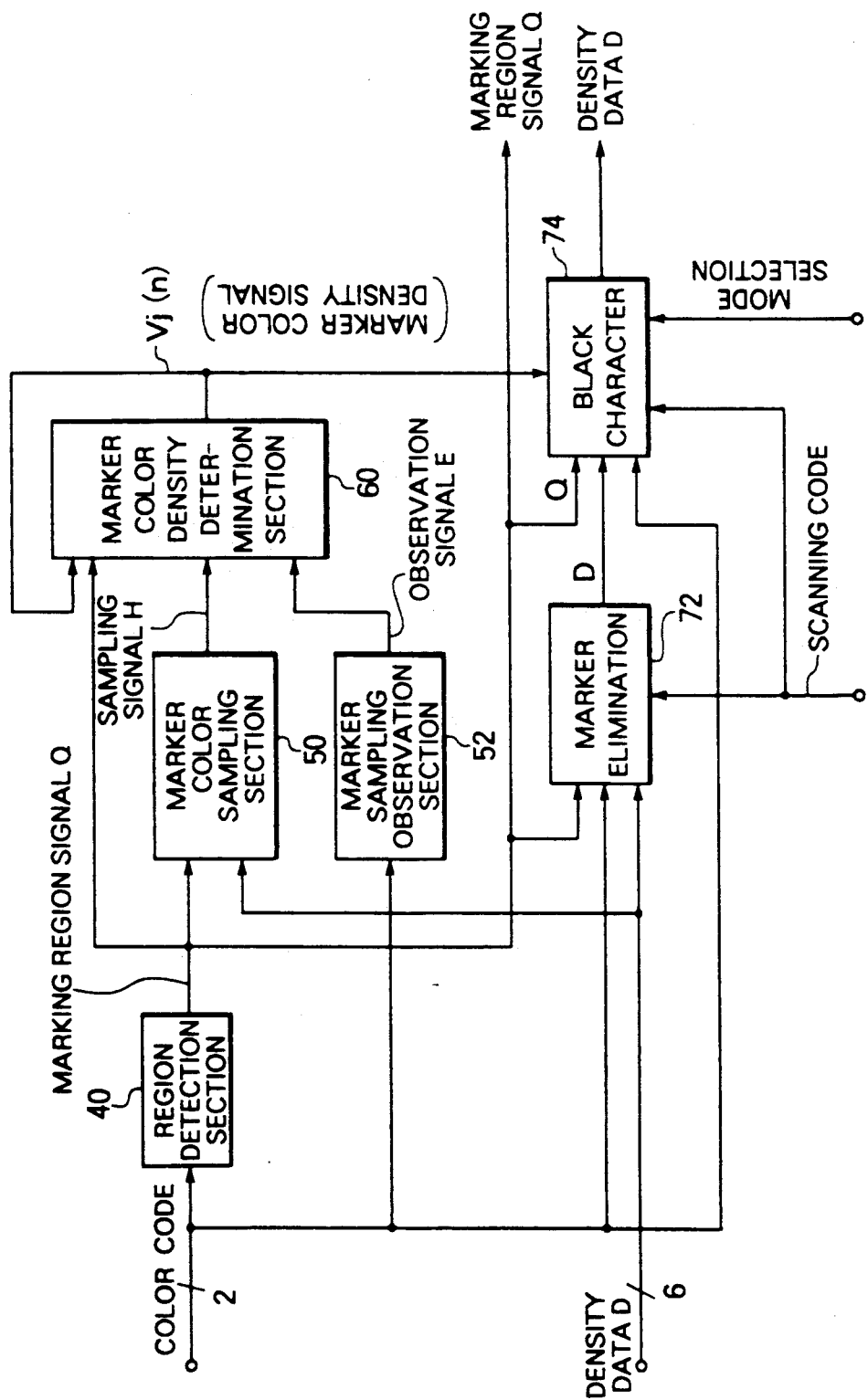
FIG. 16 is a block diagram for a marker color conversion circuit.

FIG. 16 shows a marker color conversion circuit 30. In the figure, number 40 indicates a region detection section that can detect the color marker and extract a region enclosed by the marker MC to generate a region signal Q. Number 50 is a marker color sampling section that samples the density data of the marker color (either of cyan, magenta, yellow, or black) to obtain a sampling signal (density data) H when the marker region signal Q is generated.

Number 60 is a marker color density determination section that determines whether the sampling signal H, as it is, can be used as the density data for the marker MC. The marker color density determination section 60, therefore, receives the marker region signal Q, the sampling signal H, and an observation signal E described below.

Number 52 is a marker sampling observation section that observes whether sampling of the marker MC is valid or invalid depending on the color code. It outputs the observation signal E.

Number 72 is a marker elimination circuit that prevents the marker from being recorded. The color code, the density data D, the marker region signal Q and a scanning code are also fed to the circuit. It passes through an input black (K) data as this is when the printer unit 84 is recording the black (K), and passes only the black data in the marker region when it is recording the yellow, magenta, cyan, and black. A truth value table of the marker elimination 72 is shown in FIG. 17.

Number 74 is a black character conversion circuit that performs multiplication regarding only to the marker region, but passes through the black data regarding to the other regions. Marker color density signal V described below, the density data D, the color code, the marker region signal Q as well as the two bit scanning code are fed to the circuit, and the black image density data D enclosed by the marker MC is converted to a marker color and is outputted. That is, the output density data, as shown in FIG. 18, is the input density data D multiplied by a coefficient V/Do where Do is any constant.

In turn, the following describes the marker color conversion circuit 30 in detail. FIG. 19 is an example of a region detection section 40 which comprises marking defection compensation circuit 40A and marking region processing circuit 40B.

The marking defection compensation circuit 40A compensates the marker MC for thinness and breaks in the main scanning direction and auxiliary scanning direction. The color code is first converted to marker signal MS in marker signal conversion section 41. As the marker signal MS is obtained when the color code is chromatic, a relationship between the color code and the marker signal MS is shown in FIG. 20. The marker signal MS is fed to main scanning direction marking defection compensation section 42.

FIG. 21 shows an example of the main scanning direction marking defection compensation section 42 which has seven cascaded delay devices 421 through 427 for one pixel each, output of which is fed to flag processing 428. When all the inputs are '1', a marker continuity flag becomes '1'. The flag is latched by latch 429.

The marker continuity flag is fed to flag processing 428 and Mi calculation circuit 430. The Mi calculation circuit 430 receives output Mi of the first delay device 421. The circuit is an OR circuit, and it is organized such that the output marker signal MS of the circuit is turned to '1' whenever the marker continuity flag or marker signal Mi is '1'. This can compensate the marker break for at least seven pixels in the main scanning direction.

After the marker break in the main scanning direction has been compensated, similarly succeeding auxiliary scanning direction marking defection compensation section 44 compensates for marker break in the auxiliary scanning direction. In this example, it compensates the marker break for at least seven lines.

The marking region processing circuit 40B generates the marker region signal Q corresponding to the region enclosed by the marker signal MS. The following describes it in reference to FIGS. 22 and 23.

Figure 22:
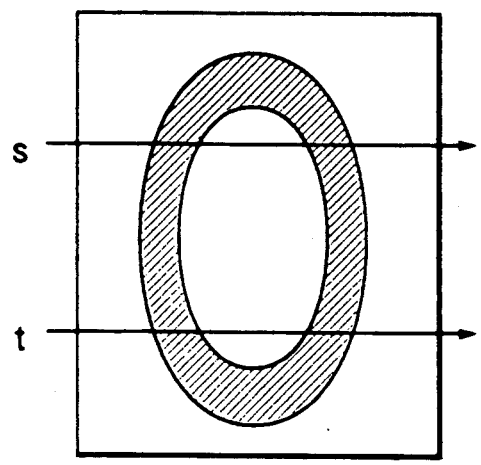
FIG. 22 is an illustration of a marker region.
Figure 23:
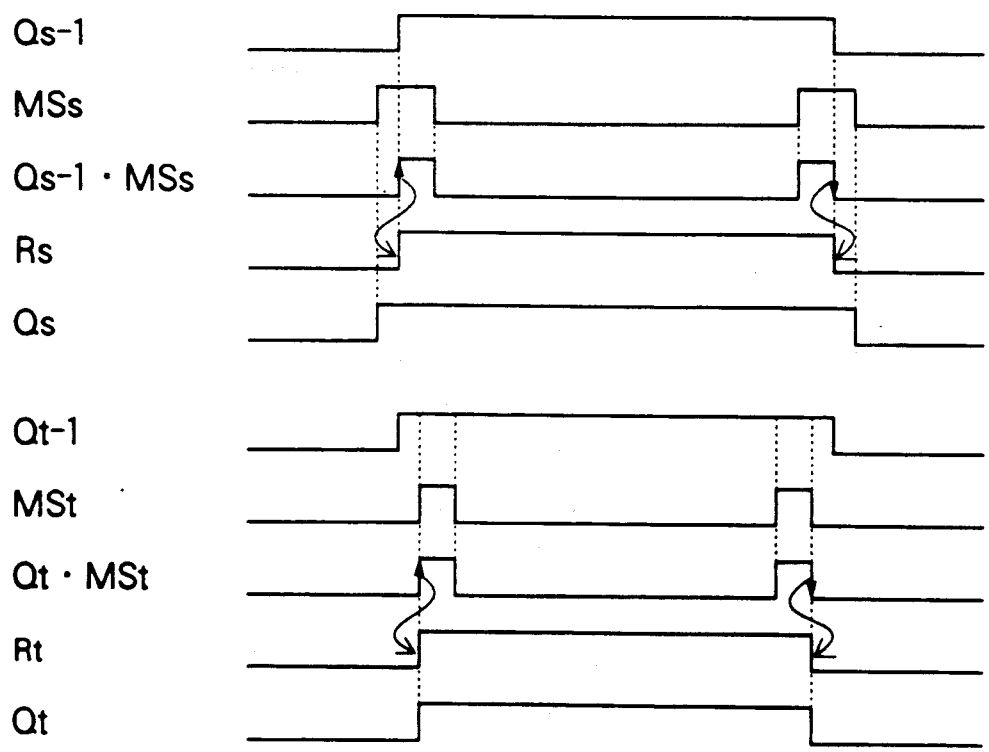
FIG. 23 and 24 are illustration of marker region signals.

If scanning is made in line 's' in FIG. 22, the marker signal is generated like MSs in FIG. 23. Let the region signal obtained right before at a preceding scan 's-1' (not shown in FIG. 22) be $Qs_{-1}$ in FIG. 23.

The marking region processing circuit 40B determines $Qs_{-1}$ AND MSs, and creates an edge detection pulse RS which is from a rising edge of $Qs_{-1}$ AND MSs to its falling edge. It also creates OR signal Qs of the marker signal MSs and the edge detection pulse Rs. The signal Qs is assumed as the marker region signal Q of the current scanning line 's'.

Similarly, a marker signal obtained at scanning such as line 't' in FIG. 22 is generated like MSt in FIG. 23. Let the region signal obtained right before the preceding scan 't-1'(not shown in FIG. 22) be $Qt_{-1}$ in FIG. 23.

The marking region processing circuit 40B determines $Qt_{-1}$ AND MSt, and creates an edge detection pulse Rt which is from a rising edge of $Qt_{-1}$ AND MSt to its falling edge. It also creates OR signal Qt of the marker signal MSt and the edge detection pulse Rt. The signal Qt is assumed as the marker region signal Q of the current scanning line 't'.

Figure 24:
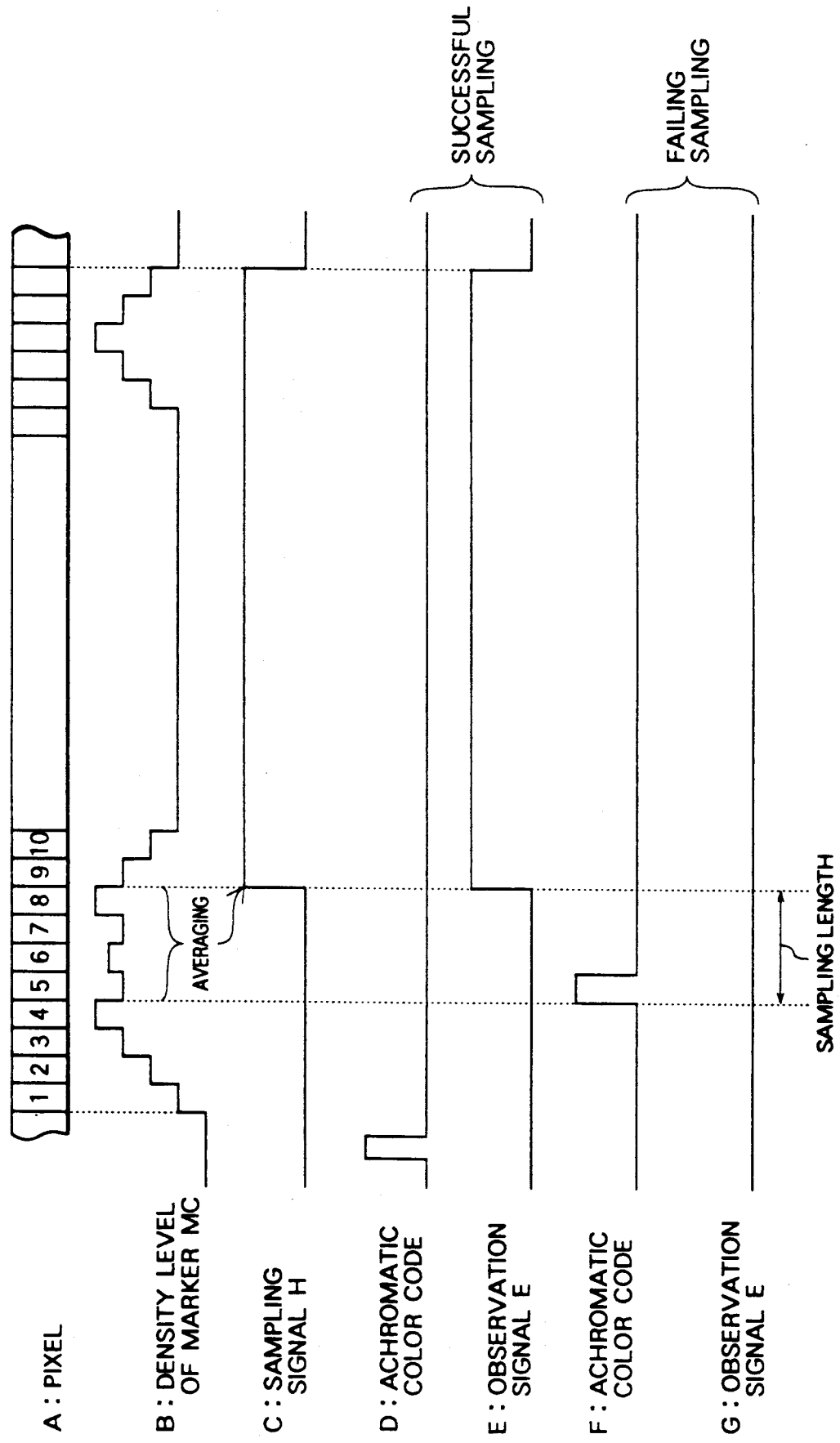

After the marker region has been detected as described above, it is necessary to sample the color data of the marker. For the sampling process, in this example, the density levels of four pixels are sampled after the fourth pixel from the marker edge for stability of the marker data (FIGS. 24 A and B). An average of the sampled values is assumed as sampling signal H (density data) of the cyan, magenta, yellow, and black in the marker signal MS (FIG. 24 C).

Marker sampling observation section 52 in FIG. 16 is a means for ensuring that the sampling process in marker color sampling section 50 is effective when the marker signal MS has no achromatic color code. The section, therefore, as shown in FIG. 24 D through G, feeds out observation signal E that makes the sampling process effective only when the achromatic color code is present outside of the region of the marker signal MS.

Figure 25:
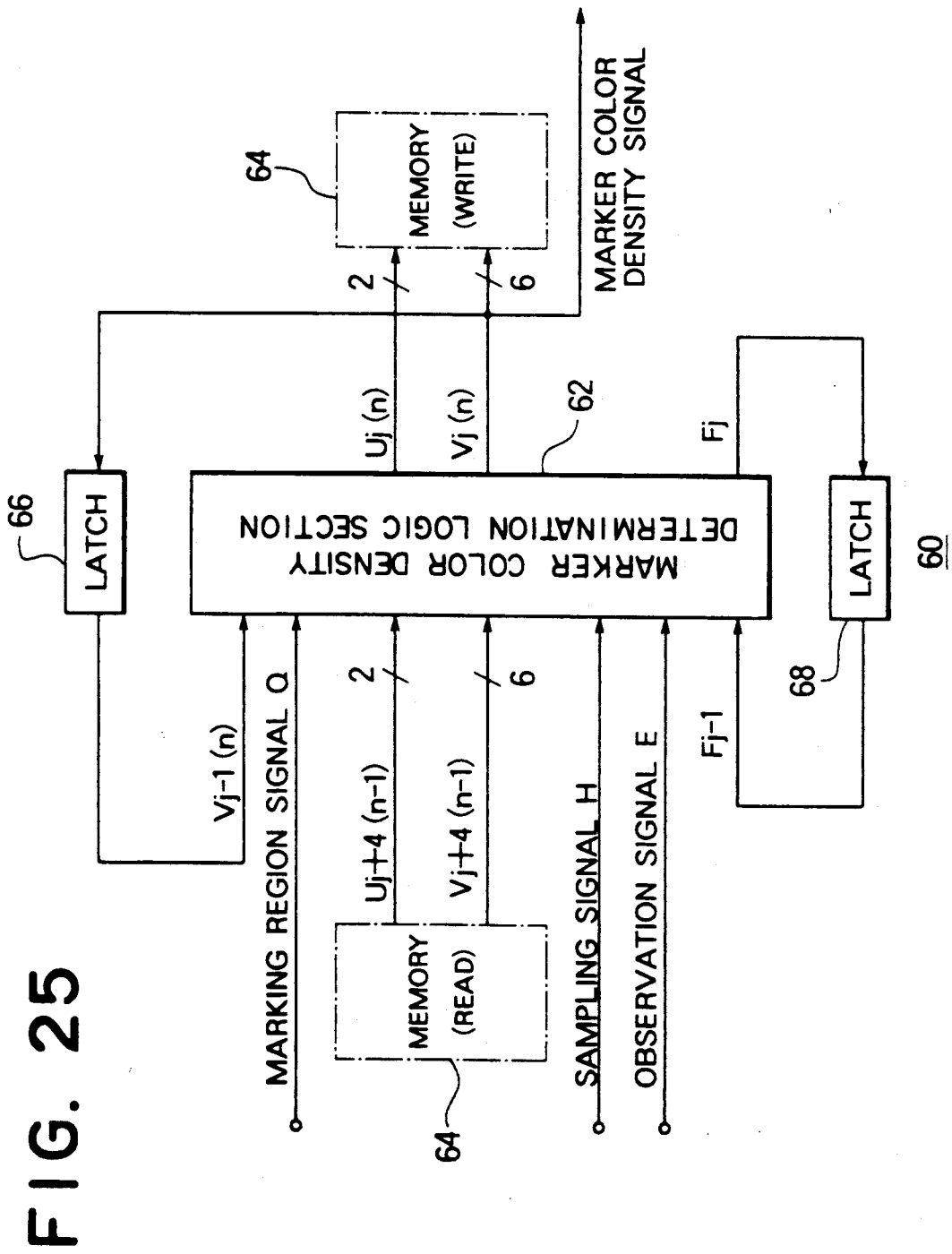
FIG. 25 is a block diagram for a marker color density determination section.

In turn, the following describes the marker color density determination section 60. The marker color density determination section 60, as shown in FIG. 25, comprises marker color density determination logic section 62, memory 64 that writes and reads data within a processing cycle for one pixel, and a pair of latches 66 and 68. It should be noted that in order to make easy description of the write and read operation of the memory 64, the figure shows as if there are two memories 64. In the figure, U indicates the contents of a two bit counter, V is the density data of the marker color, n is a scanning line, j is a pixel number, and F is a flag indicating whether the density data of the marker color is definite or indefinite.

The marker color density determination logic section 62 receives the following signals.

(1) Marker region signal Q
(2) sampling signal H
(3) Observation signal E
(4) Flag F
(5) Counter output U read from the memory 64
(6) Density signal V on current and preceding lines read from the memory 64

These input signals prompt the marker color density determination logic section 62 to feed out the following signals.

(7) Counter output U of current line written in the memory 64
(8) Density signal V of current line written in the memory 64

The following describes on what conditions the density of the marker MC is identified. The following example assumes that data on the third line entered in the marker region be data for the marker MC. (I) When Q=0, the color conversion process is not necessary outside the marker region. The following are written in the memory.

$Uj(n)=0$ $Vj(n)=0$

Also,

Fj=0.

(II) When Q=1, $Uj+4(n-1)<3$, Fj=0:

Sampling is effective for the fourth and succeeding pixels with scanning made on the first line of the marker MC, that is E=1 from the ninth pixel.

$Uj(n) = Uj + 4(n-1) + 1$ $Vj(n) = H$ $Fj = 0$

Figure 26:
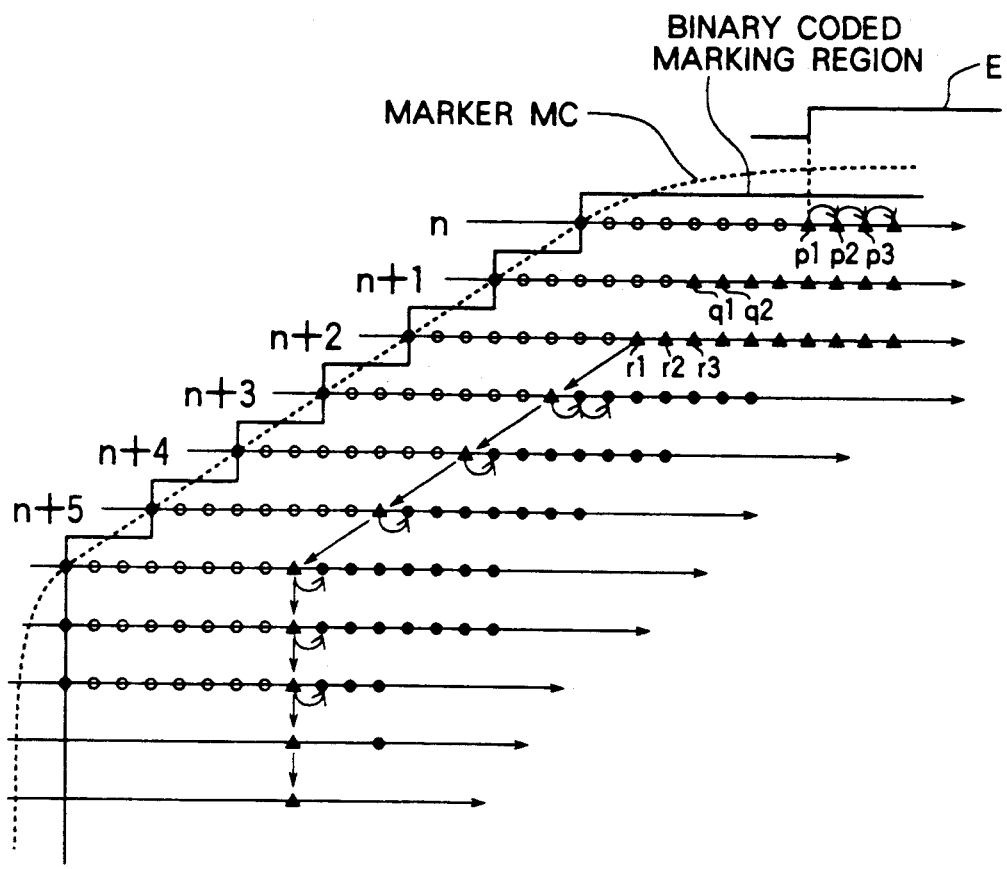
FIG. 26 through 32 are illustrations of marker color density determination.

The counter output of $Uj + 4(n-1) + 1$ which has been increased by 1, as shown above, is stored as the counter output of $Uj(n)$ for the current line n. As the density data is first stored, the density data $Vj(n)$ itself of the sampling signal H is stored, as well. That is, the density data (average value) obtained at the ninth pixel is stored as shown in FIG. 26. For the succeeding pixels, also, the density data $Vj(n)$ itself of the sampling signal H is stored.

However, the density data of the marker MC is not made definite yet (Fj=0) in relation to use of the density data on the third line. As Q=0 outside the region of the marker MC, control returns to the condition (I) discussed above. The density data leaves indefinite.

In FIG. 26, a circle mark indicates the pixel on line, and the pixel marked with a triangle is the density data of the pixel. The first triangle pixel indicates the ninth pixel. The solid marks indicate that the pixels are used as density data. (III) When Q=1, $Uj+4(n-1)<3$, E=1, Fj=1:

For the tenth and succeeding pixels on the same line n, the density data of each pixel can be stored. That is, $Uj(n) = Uj + 4(n-1) + 1$ $Vj(n) = H$ $Fj = 1$ Therefore, as shown in FIG. 26, the density data (average value) of each pixel is stored as it is. This operation continues until scanning goes out of the marker region for the same line.

(IV) When Q=1, $Uj+4(n-1)=3$, Fj=0:

Upon line n+3, or when scanning goes to the fourth line, the density data at the fourth pixels behind the same pixel position on the preceding line is stored as density data on current line. The density data is used as definite density data. Thus, $Uj(n) = Uj + 4(n-1)(=3)$ $Vj(n) = Uj + 4(n-1)$ $Fj = 1$ In the case shown in FIG. 26, the density data at the fourth pixels behind the same pixel position on the preceding line is just the density data at the ninth pixel on line n+2. For the tenth and succeeding pixels on the same line n, the density data is made definite as above because it is behind the ninth pixel, and Fj=1. Control changes to the next condition (V), discussed below.

(V) When Q=1, Fj=1:

At the tenth and succeeding pixels on the same line, the density data $Vj-1$ defined at the preceding pixel is used as it is. Thus, $Uj(n) = 3 (= Uj + 4(n-1))$ $Vj(n) = Vj - 1$ $Fj = 1$ That is, the density data defined at the ninth pixel on the same line is propagated in the scanning direction.

The density data of the pixel outside the region is made indefinite (Fj=0). So, control returns to the condition (II) on the next line. For that reason, at the ninth pixel on the next line, the density data (definite data) at four pixels before on the preceding line is used as the density data of the pixel.

As Fj=1 at the ninth pixel, processing is made under the condition (V) on tenth and succeeding pixels. Even on this line, the density data at the ninth and succeeding pixels are propagated in the scanning direction.

Figure 27:
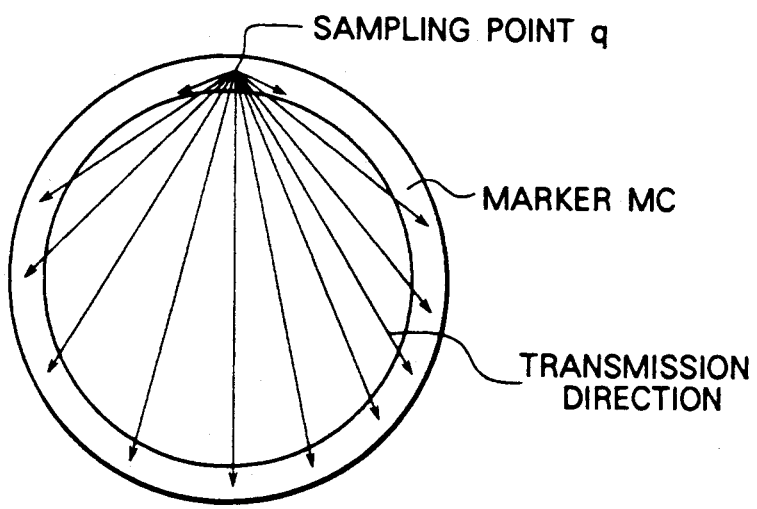

The density data defined as described above, and shown in FIG. 27, is propagated in the scanning direction and, at the same time only the density data defined first on the preceding line is propagated on the next line.

Figure 28:
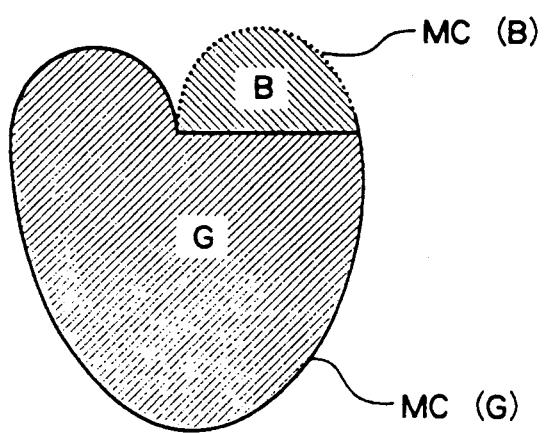

As a result, even in the case shown in FIG. 28, the color and density data of the marker MC defined first is propagated in the entire region.

However, for a special marking fashion of the marker MC like the one in FIG. 28 where only the dotted line region has a different marker MC (blue in this example) and the remaining solid line region has a marker MC using such as green, printing is made in the following colors.

Figure 29:
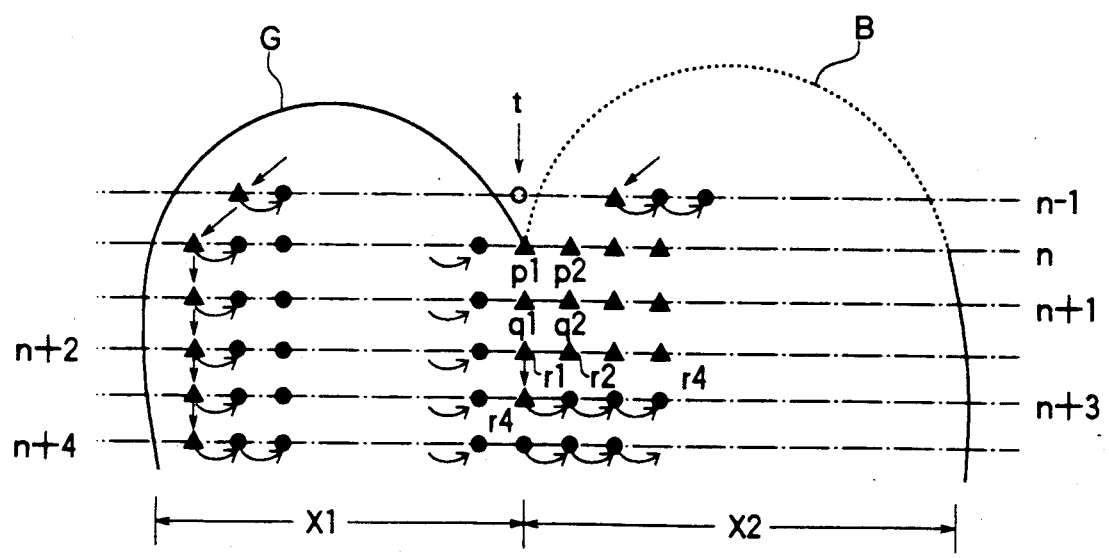

In FIG. 29, the marker region is broken in sections X1 and X2. In section X1, the marker color is green. The density data defined in the first region is propagated to the lower lines successively. In section X2, the marker color is blue. The density data defined in the first region is propagated to the lower lines successively.

The density data of the pixel is not defined on line n. The sampling signal H of the pixel is used as the density data under the condition (III) mentioned previously until line n+2.

On line n+3, the density data on the preceding line is used under the condition (II) even for pixel t. The marker color and density data in the section X1, therefore, are different from those in the section X2 as propagated in the scanning direction and auxiliary scanning direction until line n+3.

However, on the next line n+4, the density data is defined under the condition (V). The marker color and the density data defined in the section X1 is propagated to the section X2.

In short, and as shown in FIG. 29, the region where scanning is made with the marker color defined first in the section X2 is in the section X2 alone, and up to line n+3. This result in that most of the region, therefore, is scanned by the marker color and the density data defined in the section X1.

As described above, the color region is controlled in units of line. The reason is that as shown in FIG. 26; the density data of the next line is propagated to the preceding line, and is propagated in the scanning direction as it is.

Figure 30:
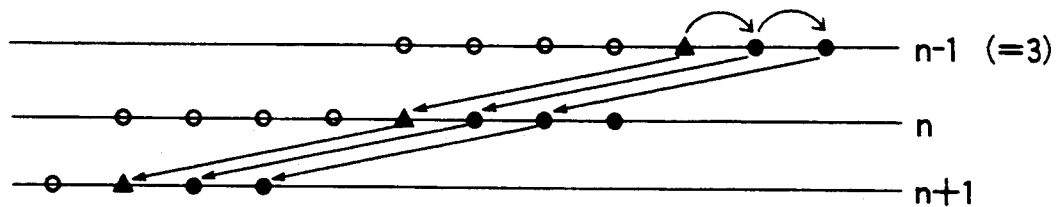

For reference, as shown in FIG. 30, if a data propagation method is made in such a way that the density data of the fourth pixel later in the preceding line is used as the density data for the pixels on the next line, then the result shown in FIG. 28 cannot be obtained even if the density data on the preceding line is used as the first density data on the line.

Figure 31:
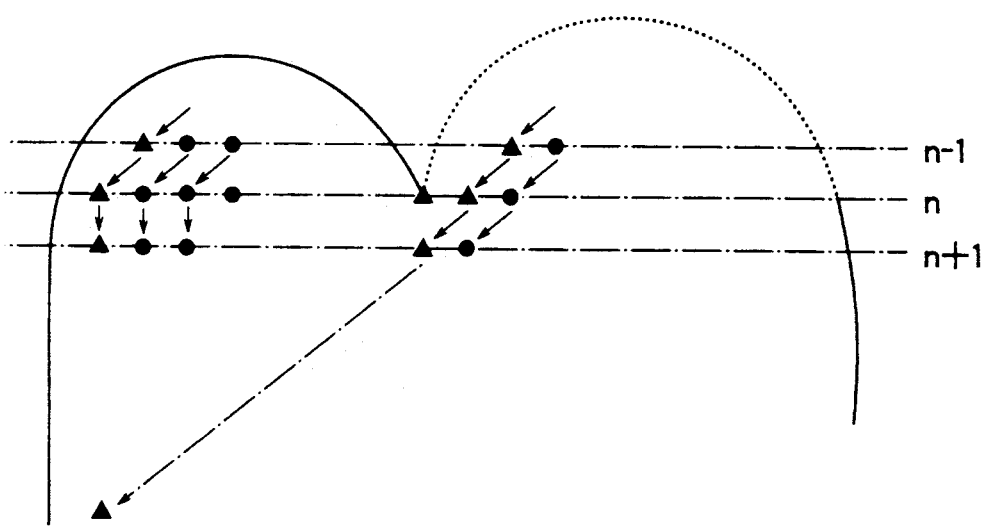
Figure 32:
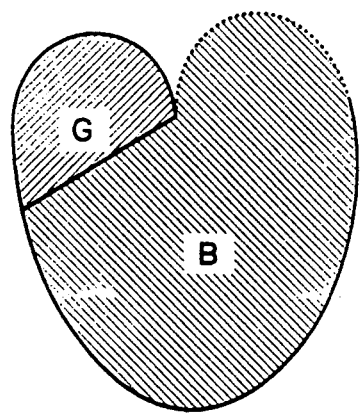
Figure 34A:
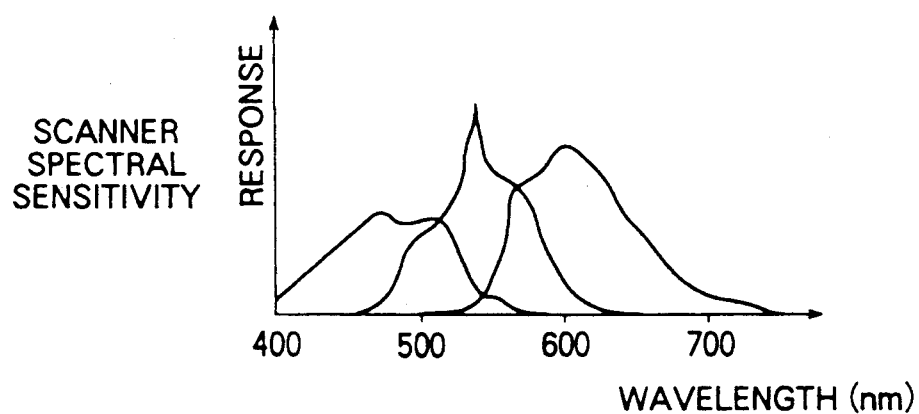
FIGS. 34A and 34B show scanner spectral characteristics and toner spectral reflectance characteristics.
Figure 34B:
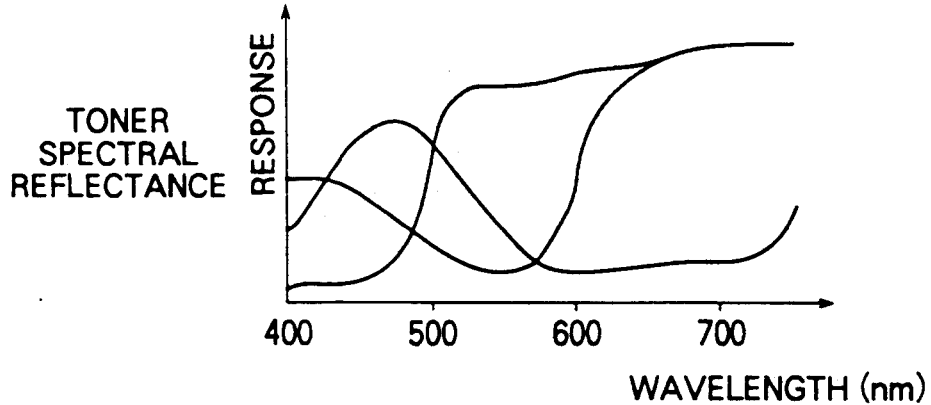
Figure 35:
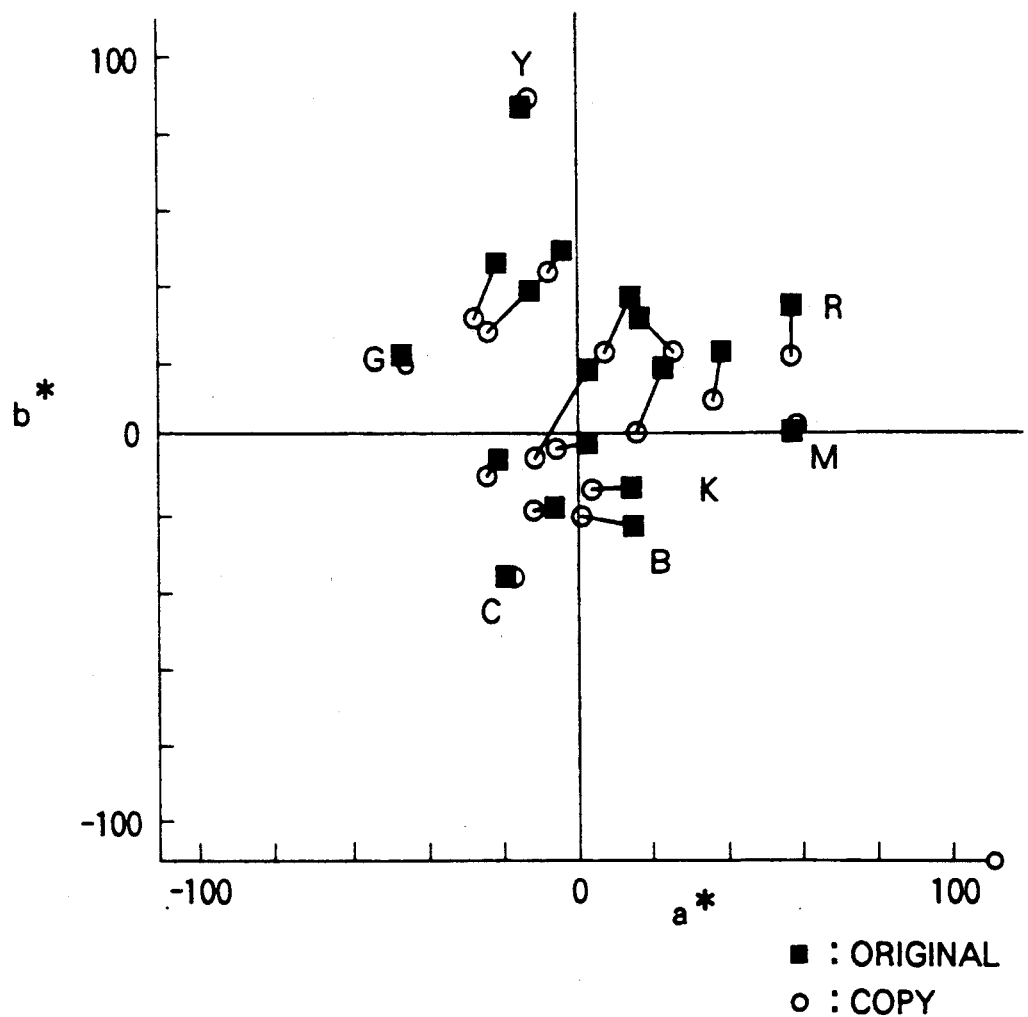
FIG. 35 is an L*a*b* system of coordinates.

The reason is that the density data is propagated as shown in FIG. 31 as long as the density data of the fourth pixel later in the preceding line is used as the density data for the pixels on the next line. The density data in the section X2 enters the section X1. This continues until the propagation density data is used as the first density data in the section X1. Finally, the result becomes like that shown in FIG. 32. The marker color defined in the section X1 vanishes. It cannot be said therefore that the method of marker color definition of FIGS. 30 and 31 is effective.

As described above, the density data (=r1) at the sampling point r taken on the third line is propagated in the scanning direction and auxiliary scanning direction as it is. The density data on the third line, therefore, is used as the density data for the marker MC.

This allows the density of the marker MC to be defined on the third line. The color and density can be kept even if the color changes or the density becomes low the course of the marker MC.

(V) When $Q=1$, $Uj+4(n-1)<3$, $E=0$, $Fj=0$:

If the sampling is not effective until the third line, and if the flag F is not defined, or if $E=0$ and $Fj=0$ (though this is rare case), the density data on the preceding line is stored under the following conditions.

$$Uj(n) = Uj + 4(n-1)$$

$$Vj(n) = Uj + 4(n-1)$$

$$Fj = 0$$

So far, the color image processing apparatus according to the present invention has been described for use in the color copying machine. However, it is a matter of course that it can be used in other kinds of apparatuses which process various color images.

In accordance with the present invention, and as described above, the multi-density conversion means is made of the memory having the density correction data stored so that it can refer to the compensation data as necessary.

Such a construction allows the multi-density conversion means to be greatly simplified, lowering its cost as compared to convention models.

Also, according to the present invention, the red, green, and blue input signals are converted to cyan, magenta, and yellow signals in such a way that the system of coordinates, including red, green, blue, cyan, magenta, yellow, and black, is divided into a plurality of regions, and the masking coefficients for the respective regions are calculated and selected on the basis of the red, green, and blue input signals.

This is effective in that the conversion error due to the linear masking method is small, thereby improving the color production characteristic in the chromatic color as compared with the prior art.

Also, the undercolor removing process allows the gray balance of a high density portion to be precisely kept even in the achromatic color region. As such, this process provides highly precise color reproduction even for the achromatic color.

What is claimed is:

1. A color processing apparatus for reproducing a color image from a plurality of separated color image signals, the apparatus comprising:
   means for generating said plurality of separated color image signals;
   first means for converting said plurality of separated color image signals into a plurality of digital image signals;
   second means for converting said plurality of digital image signals into a plurality of corresponding density signals, wherein said second converting means comprises memory means having a plurality of sets of density conversion data for respectively converting said plurality of digital image signals;
   means for controlling said second converting means so that said second converting means selects a specified data from each set of said plurality of sets of density conversion data, as indicated by said controlling means, for converting said plurality of digital image signals into said plurality of corresponding density signals in accordance with said specified data, wherein said controlling means includes means for inputting color balance and density conditions, and each set of said plurality of sets of density conversion data of said second converting means is directly related to said color balance and density conditions, so that color balance and density of each of said plurality of corresponding density signals is directly determined by each respective set of said plurality of sets of density conversion data; and
   means for reproducing said color image in accordance with said plurality of corresponding density signals.

2. The apparatus of claim 1, wherein said memory means is a ROM memory.

3. The apparatus of claim 1, wherein said reproducing means uses a plurality of color toners to reproduce said color image, and said reproducing means further comprises:
   means for developing a latent image by the adhesion of layers of said color toners to form said color image, and
   means for compensating the amount of actual adhesion of said color toners so that proper amounts of said color toners according to said plurality of corresponding density signals are used to develop said latent image.

4. The apparatus of claim 3, wherein said developing means defines the amount of adhesion of each layer of said color toner by writing pulses of specific width, and said compensating means varies the writing pulse width of each layer of said color toner in accordance with said plurality of corresponding density signals.

5. The apparatus of claim 1, wherein said reproducing means uses a plurality of color toners to reproduce said color image, and said reproducing means includes third means for converting said plurality of corresponding density signals into a plurality of toner density signals for indicating appropriate amounts of color toners to be used,
   said third converting means includes a plurality of sections of masking coefficients for converting said plurality of corresponding density signals into said plurality of toner density signals, each of said sections of masking coefficients corresponding to a separate color region, as defined by specific colors of the color image, and
   said third converting means further includes means for determining which of said sections of masking coefficients is to be used for converting said plurality of corresponding density signals into said plurality of toner density signals.

6. The apparatus of claim 5, wherein each of said separate color regions is identifiable on a color space coordinate system, and said determining means includes means for reading said plurality of corresponding density signals as a coordinate on said color space coordinate system for determining which of said sections of masking coefficients is to be used for converting said plurality of corresponding density signals into said plurality of toner density signals by matching said coordinate with one of said separate color regions.

7. The apparatus of claim 6, wherein said separate color regions are identifiable on the color space coordinate system by predetermined angles and said coordinate read by said reading means is an identification angle which is representative of said plurality of corresponding density signals.

8. A color processing apparatus for reproducing a color image from a plurality of separated color image signals, the apparatus comprising:

means for generating said plurality of separated color image signals;

first means for converting said plurality of separated color image signals into a plurality of digital image signals;

second means for converting said plurality of digital image signals into a plurality of corresponding density signals, wherein said second converting means comprises memory means having a plurality of sets of density conversion data for respectively converting said plurality of digital image signals;

means for controlling said second converting means so that said second converting means selects a specified data from each set of said plurality of sets of density conversion data, as indicated by said controlling means, for converting said plurality of digital image signals into said plurality of corresponding density signals in accordance with said specified data, wherein said controlling means includes means for selecting either a picture mode to reproduce a picture image or a character mode to reproduce a character image, each set of said plurality of sets of density conversion data further defined by alternate sets of picture mode and character mode density conversion data, said selecting means appropriately referencing said alternate set of density conversion data for each of said digital image signals so that said density of said color image is adjusted according; and means for reproducing said color image in accordance with said plurality of corresponding density signals.

9. A color processing apparatus for reproducing a color image from a plurality of separated color image signals, comprising:

means for generating said plurality of separated color image signals;

first means for converting said plurality of separated color image signals into a plurality of digital image signals;

second means for converting said plurality of digital image signals into a plurality of corresponding density signals, wherein said second converting means comprises memory means having a plurality of sets of density conversion data for respectively converting said plurality of digital image signals;

means for controlling said second converting means so that said second converting means selects a specified data from each set of said plurality of sets of density conversion data, as indicated by said controlling means, for converting said plurality of digital image signals into said plurality of corresponding density signals in accordance with said specified data, wherein said controlling means includes means for inputting color balance and density conditions, each set of said plurality of sets of density conversion data of said second converting means being directly related to said color balance and density conditions, so that color balance and density of each of said plurality of corresponding density signals is directly determined by each respective set of said plurality of sets of density conversion data, and said controlling means further includes means for selecting either a picture mode to reproduce a picture image or a character mode to reproduce a character image, each set of said plurality of sets of density conversion data further defined by alternate sets of picture mode and character mode density conversion data, said selecting means appropriately referencing said alternate set of density conversion data for each of said digital image signals so that said density of said color image is adjusted accordingly; and means for reproducing said color image in accordance with said plurality of corresponding density signals.

10. A color processing apparatus for reproducing a color image from a plurality of separated color image signals, comprising:

means for generating said plurality of separated color image signals;

first means for converting said plurality of separated color image signals into a plurality of digital image signals;

second means for converting said plurality of digital image signals into a plurality of corresponding density signals, wherein said second converting means comprises memory means having a plurality of sets of density conversion data for respectively converting said plurality of digital image signals;

means for controlling said second converting means so that said second converting means selects a specified data from each set of said plurality of sets of density conversion data, as indicated by said controlling means, for converting said plurality of digital image signals into said plurality of corresponding density signals in accordance with said specified data; and means for reproducing said color image in accordance with said plurality of corresponding density signals, said reproducing means including third means for converting said plurality of corresponding density signals into a plurality of toner density signals for indicating appropriate amounts of color toners to be used for reproducing, said third converting means includes a plurality of sections of masking coefficients for converting said plurality of corresponding density signals into said plurality of toner density signals, each of said sections of masking coefficients corresponding to a separate color region, as defined by specific colors of the color image, wherein each of said separate color regions is identifiable on a color space coordinate system, and said third converting means further includes means for determining which of said sections of masking coefficients is to be used for converting said plurality of corresponding density signals into said plurality of toner density signals, said determining means includes means for reading said plurality of corresponding density signals as a coordinate on said color space coordinate system for determining which of said sections of masking coefficients is to be used for converting said plurality of corresponding density signals into said plurality of toner density signals by matching said coordinate with one of said separate color regions.

11. The apparatus of claim 10, wherein said separate color regions are identifiable on the color space coordinate system by predetermined angles and said coordinate read by said reading means is an identification angle which is representative of said plurality of corresponding density signals.

* * * * *

UNITED STATES PATENT AND TRADEMARK OFFICE
CERTIFICATE OF CORRECTION

PATENT NO. : 5,237,400
DATED : August 17, 1993
INVENTOR(S) : KOJI WASHIO et al.

It is certified that error appears in the above-identified patent and that said Letters Patent is hereby corrected as shown below:

Claim 8, column 21, line 43, change "according"
            to --accordingly--.

Signed and Sealed this

Fifth Day of April, 1994

Attest:

BRUCE LEHMAN

*Attesting Officer*    *Commissioner of Patents and Trademarks*